US008301343B2

(12) United States Patent
Tanimoto

(10) Patent No.: US 8,301,343 B2
(45) Date of Patent: Oct. 30, 2012

(54) VEHICLE BEHAVIOR CONTROL DEVICE

(75) Inventor: Mitsutaka Tanimoto, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 557 days.

(21) Appl. No.: 12/527,712

(22) PCT Filed: Apr. 28, 2008

(86) PCT No.: PCT/JP2008/058188
§ 371 (c)(1),
(2), (4) Date: Aug. 19, 2009

(87) PCT Pub. No.: WO2008/136456
PCT Pub. Date: Nov. 13, 2008

(65) Prior Publication Data
US 2010/0049375 A1   Feb. 25, 2010

(30) Foreign Application Priority Data

May 2, 2007  (JP) .................. 2007-121803

(51) Int. Cl.
*A01B 69/00* (2006.01)
(52) U.S. Cl. .......................................... 701/43; 180/271
(58) Field of Classification Search ............ 701/41, 701/43, 72; 180/271
See application file for complete search history.

(56) References Cited

U.S. PATENT DOCUMENTS

| | | | |
|---|---|---|---|
| 6,256,561 B1 | 7/2001 | Asanuma | |
| 6,879,896 B2* | 4/2005 | Martens | 701/41 |
| 6,926,374 B2 | 8/2005 | Dudeck et al. | |
| 7,555,367 B2* | 6/2009 | Kuge | 701/1 |
| 7,778,742 B2* | 8/2010 | Kuge et al. | 701/1 |
| 2003/0195684 A1* | 10/2003 | Martens | 701/41 |

FOREIGN PATENT DOCUMENTS

| | | |
|---|---|---|
| JP | 9 221052 | 8/1997 |
| JP | 10 169763 | 6/1998 |
| JP | 10 297522 | 11/1998 |
| JP | 11 321690 | 11/1999 |
| JP | 2002 331849 | 11/2002 |
| JP | 2002-331850 | 11/2002 |
| JP | 2004 34740 | 2/2004 |
| JP | 2004 504216 | 2/2004 |

(Continued)

OTHER PUBLICATIONS

Extended European Search Report issued Sep. 2, 2010, in Application No. 08752201.7-2421 / 2143611 PCT/JP2008058188.

(Continued)

*Primary Examiner* — Mark Hellner
(74) *Attorney, Agent, or Firm* — Oblon, Spivak, McClelland, Maier & Neustadt, L.L.P.

(57) ABSTRACT

A vehicle including a vehicle behavior control device in an ECU. The vehicle behavior control device obtains a line of sight direction of the driver of the vehicle by a line of sight detecting sensor for detecting the line of sight of the driver from an eye movement of the driver. The vehicle behavior control device decides a targeted traveling direction of the vehicle based on the obtained line of sight direction of the driver. Then, the vehicle behavior control device controls a rear wheel steering device such that a front-rear direction of the vehicle faces the targeted traveling direction of the vehicle.

11 Claims, 11 Drawing Sheets

FOREIGN PATENT DOCUMENTS

| | | |
|---|---|---|
| JP | 2005-153660 | 6/2005 |
| JP | 2005 231450 | 9/2005 |
| JP | 2005 251111 | 9/2005 |
| JP | 2006 71425 | 3/2006 |
| JP | 2007 269309 | 10/2007 |
| JP | 2008-174092 | 7/2008 |

OTHER PUBLICATIONS

Office Action issued Mar. 15, 2011 in Japanese Patent Application No. 2008-543337(with English translation).

* cited by examiner

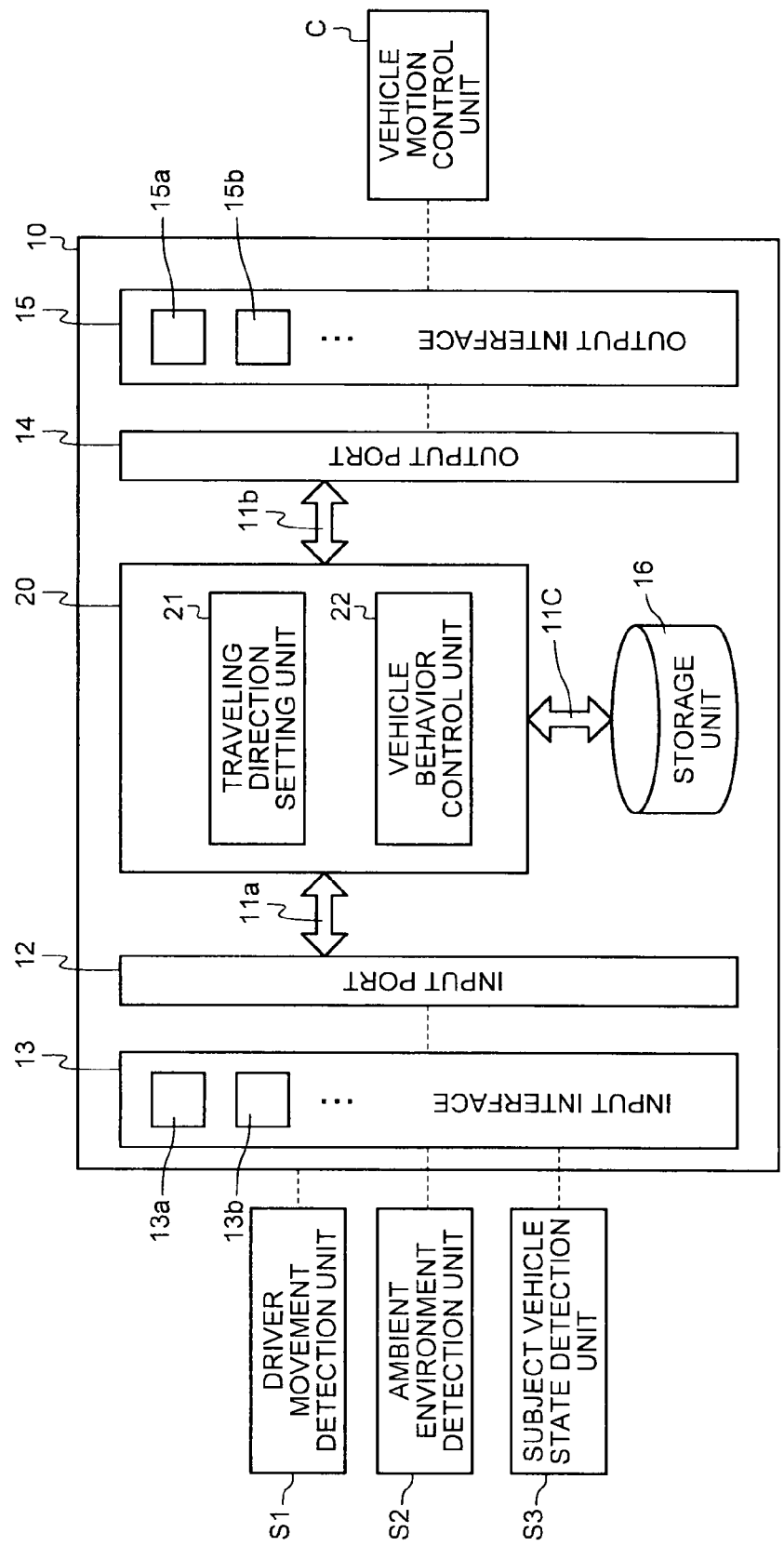

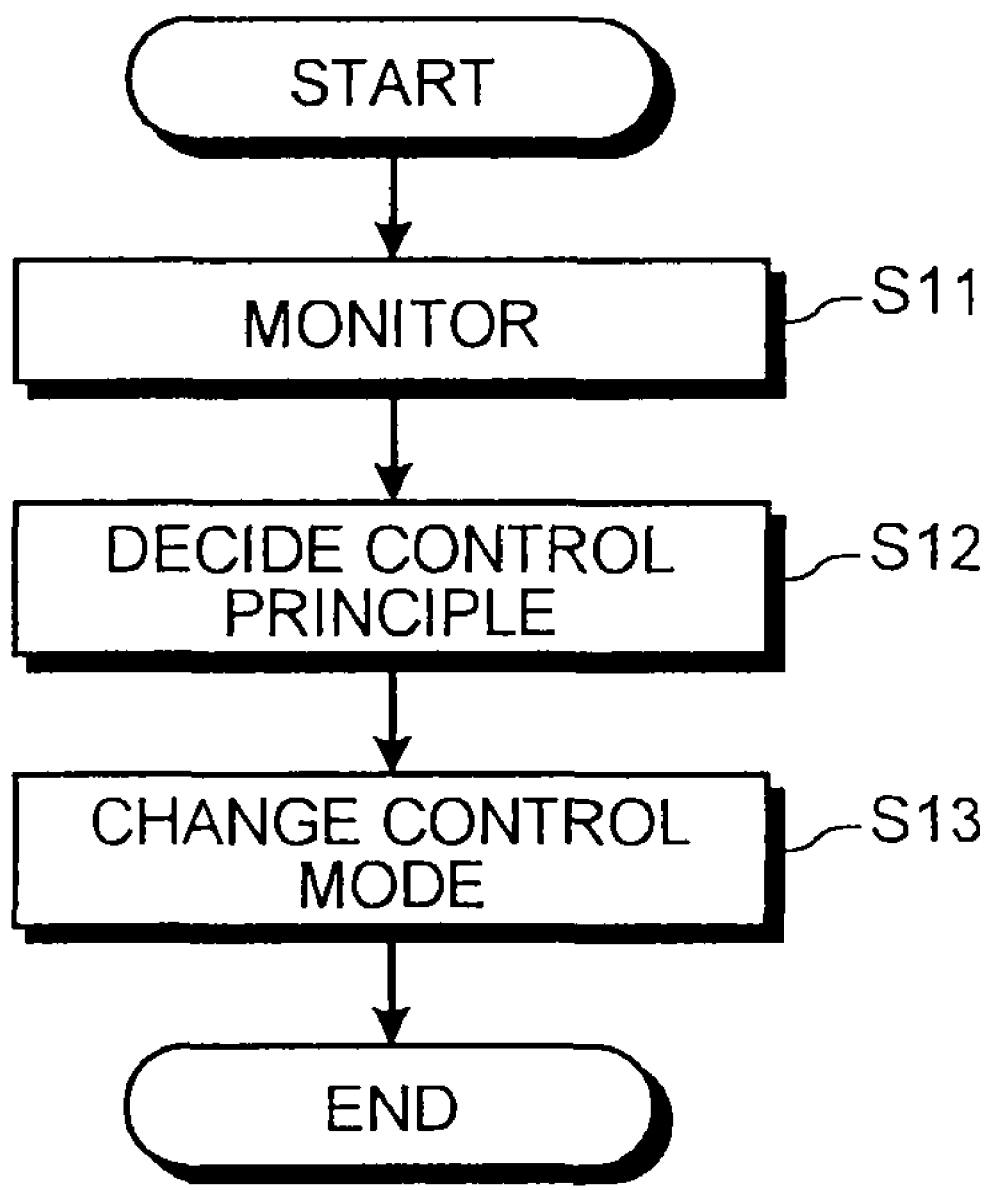

VEHICLE BEHAVIOR CONTROL DEVICE

TECHNICAL FIELD

The present invention relates to a control to assist a vehicle operation by a driver.

BACKGROUND ART

In order to reduce a load on the driver who drives the vehicle such as a passenger vehicle, a truck, and a bus, and to improve safety, a variety of driving assisting techniques for assisting the driver have been suggested and put into practical use. For example, Patent Document 1 discloses a vehicle steering device for improving a performance to avoid an obstacle by making a ratio of a steering amount of a steering wheel to an operational amount of a steering member smaller when visibility of an ambient environment is low.

Patent Document 1: Japanese Patent Application Laid-Open No. 2004-34740

DISCLOSURE OF INVENTION

Problem to be Solved by the Invention

However, in the technique disclosed in Patent Document 1, although a turning performance to avoid the obstacle may be improved, change in a field of view and the line of sight of the driver associated with the motion of the vehicle is not sufficiently considered. As a result, the line of sight of the driver does not catch up with the behavior of the vehicle in some cases, and this might bring a sense of discomfort to the driver.

Therefore, the present invention is achieved in view of the above-described problems, and an object thereof is to provide a vehicle behavior control device capable of preventing the sense of discomfort felt by the driver when assisting the vehicle operation by the driver.

Means for Solving Problem

To solve the problems as described above and to achieve an object, a vehicle behavior control device according to one aspect of the present invention includes a traveling direction setting unit that estimates a target traveling direction, which is a targeted traveling direction of a vehicle, based on a movement of a driver different from a movement performed by the driver for controlling motion of the vehicle, and a vehicle behavior control unit that changes a control mode of a vehicle behavior control to the vehicle, based on the target traveling direction set by the traveling direction setting unit.

The vehicle behavior control device changes the control mode of the vehicle behavior control to the vehicle, based on the target traveling direction of the vehicle estimated based on the movement of the driver different from the movement performed by the driver for controlling motion of the vehicle, such as a line of sight and a direction of face of the driver. Therefore, the vehicle behavior control device can execute the vehicle behavior control reflecting the intension of the driver which is not represented by the steering torque or the like and control the vehicle toward a path the driver wants to take.

In the vehicle behavior control device according to another aspect of the present invention, the vehicle behavior control unit controls the motion of the vehicle in a plane direction and executes the vehicle behavior control such that a front-rear direction of the vehicle faces the target traveling direction set by the traveling direction setting unit.

In the vehicle behavior control device according to still another aspect of the present invention, the vehicle behavior control unit makes yaw generated in the vehicle to be smaller than in a case in which the target traveling direction is present out of the direction that the vehicle drives, when the target traveling direction is present in the direction that the vehicle drives.

In the vehicle behavior control device according to still another aspect of the present invention, the vehicle behavior control unit executes the vehicle behavior control with a start of an operation to the vehicle.

In the vehicle behavior control device according to still another aspect of the present invention, the traveling direction setting unit estimates the target traveling direction based on at least one of a line of sight direction of a driver who operates the vehicle and a direction of a face of the driver.

In the vehicle behavior control device according to still another aspect of the present invention, the traveling direction setting unit excludes a direction that the vehicle cannot travel physically from the target traveling direction.

In the vehicle behavior control device according to still another aspect of the present invention, the traveling direction setting unit does not use the line of sight direction of the driver who operates the vehicle and the direction of the face of the driver when the driver does not look out of the vehicle, when estimating the target traveling direction.

In the vehicle behavior control device according to still another aspect of the present invention, in the traveling direction setting unit, one of candidates, which has a larger weight given to the candidates of the target traveling direction according to at least one of an intention of the driver and an ambient environment of the vehicle, is selected as the target traveling direction.

In the vehicle behavior control device according to still another aspect of the present invention, in the vehicle behavior control unit, the larger the weight, the larger a control amount of the vehicle behavior control.

In the vehicle behavior control device according to still another aspect of the present invention, when avoiding an object, which might collide with the vehicle, the traveling direction setting unit selects a direction judged to be safer as the target traveling direction based on information of the ambient environment of the vehicle.

In the vehicle behavior control device according to still another aspect of the present invention, the target traveling direction is a traveling direction necessary for the vehicle to avoid the collision when the vehicle might collide.

In the vehicle behavior control device according to still another aspect of the present invention, the traveling direction setting unit estimates the target traveling direction according to whether to avoid the object, which might collide with the vehicle, to the direction that the vehicle drives, or out of the direction that the vehicle drives.

Effect of the Invention

The vehicle behavior control device according to the present invention is capable of preventing the sense of discomfort felt by the driver when assisting the vehicle operation by the driver.

BRIEF DESCRIPTION OF DRAWINGS

FIG. 2 is an illustrative diagram of a configuration of the vehicle behavior control device according to the embodiment;

FIG. 3A is a flowchart of a schematic procedure of vehicle behavior control according to the embodiment;

Figure 1:
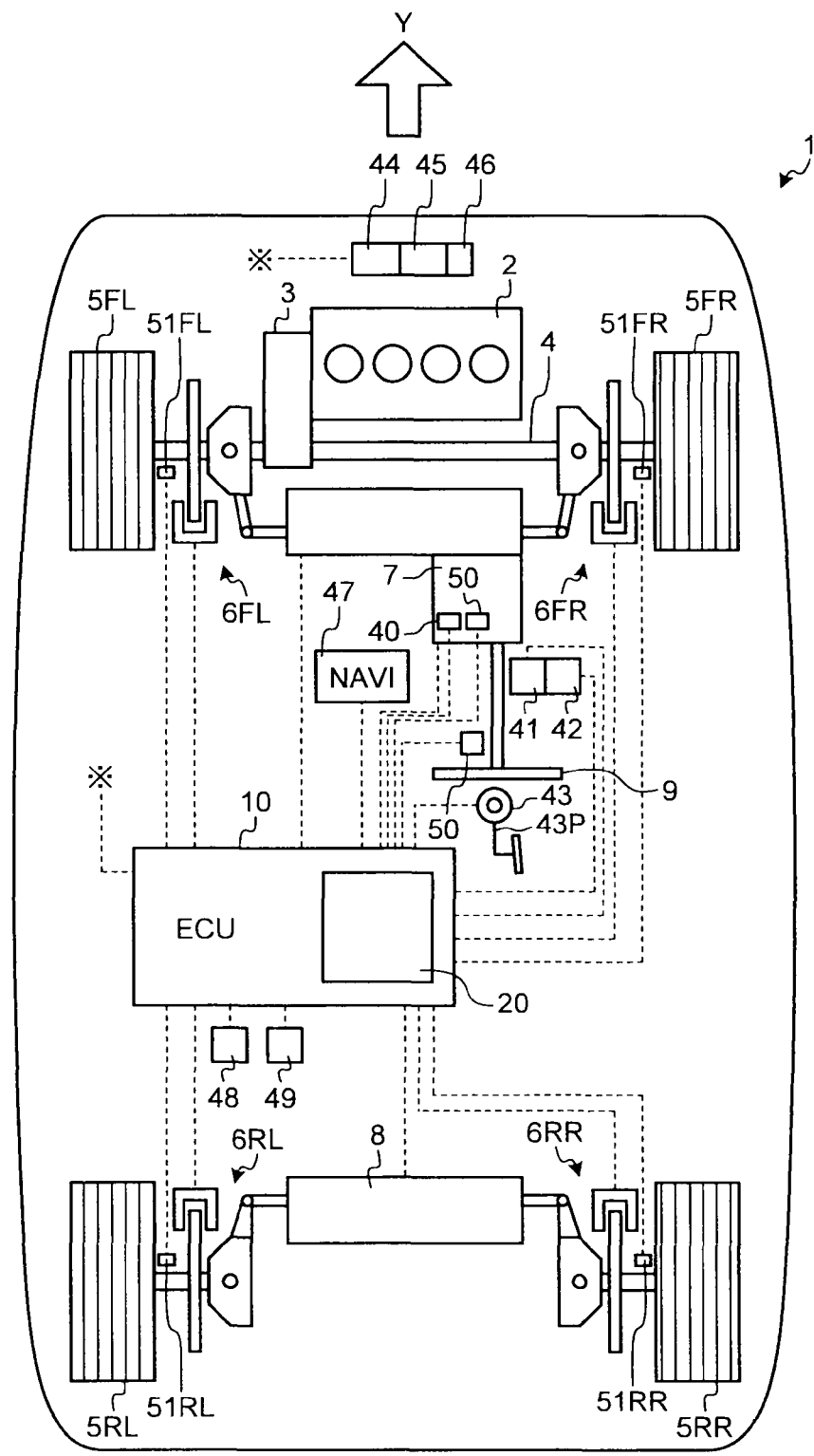
FIG. 1 is a schematic configuration diagram of a configuration example of a vehicle provided with a vehicle behavior control device according to an embodiment.

EXPLANATION OF LETTERS OR NUMERALS 1 vehicle
2 internal-combustion engine
3 gear shifter
4 drive shaft
5FL left front wheel
5FR right front wheel
5RL left rear wheel
5RR right rear wheel
6FL left front wheel braking device
6FR right front wheel braking device
6RL left rear wheel braking device
6RR right rear wheel braking device
7 front wheel steering assist device
8 rear wheel steering device
9 steering wheel
10 ECU
16 storage unit
20 vehicle behavior control device
21 traveling direction setting unit
22 vehicle behavior control unit
40 steering angle sensor
41 face direction detecting sensor
42 line of sight detecting sensor
43 brake sensor
44 object detecting sensor
45 road shape detecting sensor
46 road surface state detecting sensor
47 navigation device
48 acceleration sensor
49 yaw rate sensor
50 steering torque sensor
51EL left front wheel velocity sensor
51ER right front wheel velocity sensor
51RL left rear wheel velocity sensor
51RR right rear wheel velocity sensor
61 lane change control request parameter map
62 turn control request parameter map
C vehicle motion control unit
D driver
EL line of sight direction
J object
M door mirror
S1 driver movement detection unit
S2 ambient environment detection unit
S3 subject vehicle state detection unit

BEST MODE(S) FOR CARRYING OUT THE INVENTION

Hereinafter, the present invention is described in detail with reference to drawings. Meanwhile, the invention is not limited by the best mode for carrying out the invention (hereinafter, referred to as an embodiment). In addition, components in the following embodiment include those which are easily conceived by one skilled in the art, and those substantially identical, that is to say, equivalents thereof.

An embodiment is characterized by changing a control mode of vehicle behavior control based on a target traveling direction, which is a targeted traveling direction of the vehicle, estimated from a movement of a driver, which is different from the movement performed by the driver for controlling motion of the vehicle, such as a line of sight and a direction of face of the driver. In this case, for example, when avoiding a collision with an object, which is present in the traveling direction of the vehicle, vehicle motion control unit is controlled such that a front-rear direction (longitudinal direction) of the vehicle faces the targeted traveling direction of the vehicle (target traveling direction), which is set to avoid the object. That is to say, the vehicle motion control unit is controlled such that the front-rear direction (longitudinal direction) of the vehicle and the target traveling direction conform to or become parallel to each other.

Herein, the movement performed by the driver for controlling the motion of the vehicle refers to the movement performed by the driver for controlling the motion of the vehicle such as a velocity and a direction of the vehicle, such as operation of an accelerator, a brake, and a steering wheel by the driver. Also, the movement of the driver which is different from the movement performed by the driver for controlling the motion of the vehicle refers to not the movement to directly operate an operating device (such as the steering wheel and the accelerator) of the vehicle for controlling the motion of the vehicle, but the movement from which intention of the driver who controls the motion of the vehicle can be extracted. The movement of the driver which is different from the movement performed by the driver for controlling the motion of the vehicle includes, for example, motion of the line of sight of the driver, a handgrip of the steering wheel (for example, determined by grip strength), a change in direction of a body, the movement of the driver relative to a seat (for example, determined by a load distribution relative to the seat), and the movement of the driver relative to a footrest (for example, determined by a magnitude of load acting on the footrest).

Also, the vehicle behavior control refers to the control of a motional state of the vehicle and a posture of the vehicle according to a predetermined algorithm for estimation or setting of the targeted traveling direction of the vehicle. In addition, a motion control of the vehicle refers to the control of the traveling direction and the posture of the vehicle by controlling a drive system and an operation system of the vehicle.

In the following embodiment, the traveling direction set to avoid the collision with the object which is present in front of the vehicle in the traveling direction is set as the targeted traveling direction of the vehicle; however, the targeted traveling direction of the vehicle is not limited to this. For example, a guide path when guiding the vehicle to a predetermined place (such as a garage), and a path when changing a lane of the vehicle or when turning at an intersection or the like may be set as the targeted traveling direction of the vehicle. Herein, the front-rear direction of the vehicle is the direction parallel to a straight line connecting a central portion of a front wheel axle in an axial direction of the vehicle and a central portion of a rear wheel axle in the axial direction, and this is the longitudinal direction of the vehicle in a case of the vehicle of which length is longer than a width. In addition, in the following description, a lateral direction refers to a direction orthogonal to the front-rear direction of the vehicle.

FIG. 1 is a schematic configuration diagram showing a configuration example of the vehicle provided with a vehicle behavior control device according to this embodiment. First, an overview of an entire configuration of a vehicle 1 is described. The vehicle 1 is equipped with a vehicle behavior control device 20 according to this embodiment, and for example, the target traveling direction (such as the line of sight direction of the driver), which is set as the traveling direction for the vehicle 1 to avoid the object is controlled by the vehicle behavior control device 20 so as to be parallel to the front-rear direction of the vehicle 1.

The vehicle 1 has an internal-combustion engine 2 as power generating unit. The internal-combustion engine 2 is mounted on an anterior portion of the vehicle 1 in the traveling direction (direction indicated by an arrow Y in FIG. 1). The power generated by the internal-combustion engine 2 is first input to a gear shifter 3 and decelerated to a rotating speed suitable for driving the vehicle 1, and then transferred to a left front wheel 5FL and a right front wheel 5FR, which are driving wheels, through a drive shaft 4. Thereby, the vehicle 1 drives. Meanwhile, although the internal-combustion engine 2 is a gasoline-fueled reciprocating spark-ignition internal-combustion engine in this embodiment, the internal-combustion engine 2 is not limited to this.

Also, the power generating unit of the vehicle 1 is not limited to the internal-combustion engine. For example, this may be provided with so-called hybrid power generating unit obtained by combining the internal-combustion engine and an electric motor, and a so-called in-wheel motor type power generating unit equipped with the electric motor on each wheel. Further, the gear shifter 3 may be provided with a function to change a driving force of the left front wheel 5FL and the driving force of the right front wheel 5FR.

The left front wheel 5FL and the right front wheel 5FR of the vehicle 1 are the driving wheels of the vehicle 1, and also act as steering wheels. In this manner, the vehicle 1 adopts a so-called front engine front drive (FF) system as its drive system. Meanwhile, the drive system of the vehicle 1 is not limited to the FF system, and a so-called front engine rear drive (FR) system and 4-wheel drive (4WD) system may also be used. Also, the vehicle 1 may be provided with the drive system capable of controlling a turning performance of the vehicle 1 and of improving driving stability of the vehicle 1, by changing the driving force of each driving wheel.

In the vehicle 1, a left front wheel braking device 6FL, a right front wheel braking device 6FR, a left rear wheel braking device 6RL, and a right rear wheel braking device 6RR are provided on the left front wheel 5FL, the right front wheel 5FR, a left rear wheel 5RL, and a right rear wheel 5RR, respectively. The left rear wheel braking device 6RL, the right rear wheel braking device 6RR, the left front wheel braking device 6FL, and the right front wheel braking device 6FR (hereinafter, referred to as the braking device as needed) convert a tread force of a brake pedal 43P to a hydraulic pressure, and generates a braking force by this hydraulic pressure.

A braking motion input from the brake pedal 43P is detected by the brake sensor 43 attached to the brake pedal 43P. The brake sensor 43 may obtain a tread amount and a tread velocity of the brake pedal 43P by detecting a stroke, the tread force, and a master cylinder pressure of the brake pedal 43P.

Information of the tread amount and the tread velocity of the brake pedal 43P detected by the brake sensor 43 is input to an electronic control unit (ECU) 10. In this embodiment, the ECU 10 adjusts the braking force of each braking device according to a state of the road surface and the behavior of the vehicle 1 to control lock of the left front wheel 5FL and the right rear wheel 5RR while braking. Also, this may fulfill a so-called anti-skidding function to stabilize the posture of the vehicle by preventing skidding of the vehicle while the vehicle 1 turns and when this starts moving, by adjusting the braking force of each wheel of the vehicle 1.

In the vehicle 1 according to this embodiment, the operation of a steering wheel 9 by the driver is transferred to the left front wheel 5FL and the right front wheel 5FR through a front wheel steering assist device 7, and the left front wheel 5FL and the right front wheel 5FR are steered. The front wheel steering assist device 7 is provided with a so-called power steering function for reducing a steering force of the driver and a so-called variable steering ratio function to change steering angles of the left front wheel 5FL and the right front wheel 5FR relative to an operation amount of the steering wheel 9 according to an operating state (such as a vehicle velocity) of the vehicle 1.

Also, the vehicle 1 according to this embodiment is provided with a rear wheel steering device (ARS) 8 controlled by the ECU 10. The rear wheel steering device 8 is for steering the left rear wheel 5RL and the right rear wheel 5RR, and they are steered in the same phase with or in the opposite phase to the steering angles of the left front wheel 5FL and the right front wheel 5FR, according to the operating state (such as the vehicle velocity and the turning state) of the vehicle 1.

The vehicle 1 is provided with sensors for detecting the movement of the driver of the vehicle 1, sensors for detecting an ambient environment of the vehicle 1 (such as presence or absence of the object and an avoidance space), or sensors for detecting the operating state of the vehicle 1. The sensors for detecting the movement of the driver of the vehicle 1 include a steering angle sensor 40 for detecting a steering angle of the steering wheel 9, a face direction detecting sensor (camera) 41 for detecting a direction of the face of the driver, a line of sight detecting sensor (camera) 42 for detecting the line of sight of the driver from an eye movement of the driver, the brake sensor 43, and a steering torque sensor 50. They are collectively referred to as driver movement detection unit.

Meanwhile, the operation of the steering wheel 9 by the driver may be determined based on the steering force and a rate of change of the steering force of the steering wheel 9 detected by the steering torque sensor 50 of the front wheel steering assist device 7. The movement of the driver of the vehicle 1 is detected by the driver movement detection unit, and a direction that the driver wants to allow the vehicle 1 to travel is determined.

The sensors for detecting the ambient environment of the vehicle 1 include an object detecting sensor 44 provided in front of the vehicle 1 in the traveling direction, a road shape detecting sensor 45, a road surface state detecting sensor 46, and a navigation device 47. They are collectively referred to as ambient environment detection unit. The ambient environment of the vehicle 1 refers to information which might affect the driving of the vehicle 1, such as information of the object (such as a preceding vehicle and a fallen rock) which is present in the traveling direction of the vehicle 1 and information regarding a circumstance (presence or absence of the intersection, increase or decrease in the number of lanes, and whether the road surface is a low-µ surface or not) in the traveling direction of the vehicle 1.

The object detecting sensor 44 is for detecting the object (a parked vehicle, the preceding vehicle, and the fallen rock, for example) which is present in front of the vehicle 1 in the traveling direction, and for example, a millimeter wave radar device, a laser radar device, a sonar device, or a camera is used. The road shape detecting sensor 45 is used for detecting the information of the road in the traveling direction of the vehicle 1, for example, information that there is an intersection in the traveling direction of the vehicle 1 and that the road in the traveling direction of the vehicle 1 becomes two-lane from one-lane. The camera is used, for example, as the road shape detecting sensor 45.

In addition, the navigation device 47 is also used for detecting the information of the road in the traveling direction of the vehicle 1. For example, the road information such as a width of the road which is present in the traveling direction of the vehicle 1, a distance to the intersection, a radius of a curve, and presence or absence of the avoidance space is determined based on present position information of the vehicle 1 obtained by a global positioning system (GPS), and a map and terrain information that the navigation device 47 has.

The road surface state detecting sensor 46 is for detecting the state of the road surface on which the vehicle 1 drives, and the camera is used, for example. Also, in addition to the camera, a thermometer, road surface temperature detection unit, and unit for detecting a force generated by the driving wheel, lock and slip of the wheel (such as the left front wheel 5FL and the right front wheel 5FR) of the vehicle 1, a frictional coefficient between the road surface and the wheel, and difference in the frictional coefficients between wheels may be used as the road state detecting sensor 46. Then, the state of the road surface on which the vehicle 1 drives is determined based on the information detected by the aforementioned elements.

Meanwhile, the force generated by the driving wheel may be obtained based on the torque generated by the internal-combustion engine 2, a transmission gear ratio of the gear shifter 3, a radius of the driving wheel, and the like. The lock and slip of the wheel of the vehicle 1 may be detected by a left front wheel velocity sensor 51FL, a right front wheel velocity sensor 51FR, the left rear wheel velocity sensor 51RL, and a right rear wheel velocity sensor 51RR provided on each wheel of the vehicle 1. The frictional coefficient between the road surface and the wheel may be obtained, for example, from a ratio of a load on the driving wheel and the driving force generated by the driving wheel.

The motional state of the vehicle 1 is detected by an acceleration sensor 48, a yaw rate sensor 49, the left front wheel velocity sensor 51FL, the right front wheel velocity sensor 51FR, the left rear wheel velocity sensor 51RL, and the right rear wheel velocity sensor 51RR. They are collectively referred to as subject vehicle state detection unit. The motional state of the vehicle 1 is decided, for example, by a front-rear velocity (a velocity in the front-rear direction of the vehicle 1) and front-rear acceleration of the vehicle 1, a lateral velocity (velocity in a direction orthogonal to the front-rear direction) and lateral acceleration of the vehicle 1, a yaw angle, a yaw angle velocity, and yaw angle acceleration of the vehicle 1, and a slip angle, a slip angle velocity, and slip angle acceleration of the vehicle 1. Meanwhile, the above-described driver movement detection unit, the ambient environment detection unit, and the subject vehicle state detection unit are illustrative only, and are not limited to the above-described sensors.

FIG. 2 is an illustrative diagram showing a configuration of the vehicle behavior control device according to this embodiment. In the following description, please appropriately refer to FIG. 1. The vehicle behavior control device 20 is provided in the ECU 10 for controlling the internal-combustion engine 2, the front wheel steering assist device 7, and the rear wheel steering device 8 of the vehicle 1, and is configured to realize the vehicle behavior control according to this embodiment as one function of the ECU 10. The vehicle behavior control device 20 is a so-called central processing unit (CPU) and executes the vehicle behavior control according to this embodiment according to a computer program for realizing the vehicle behavior control according to this embodiment stored in a storage unit 16.

The vehicle behavior control device 20 and the storage unit 16 are connected by a data bus 11c and are communicatable with each other. The ECU 100 is provided with an input port 12 and an input interface 13 for the vehicle behavior control device 20 to obtain the information necessary for the vehicle behavior control according to this embodiment. Also, this is provided with an output port 14 and an output interface 15 for the vehicle behavior control device 20 to operate the controlled object. The vehicle behavior control device 20 and the input port 12 are connected by a data bus 11a, and the vehicle behavior control device 20 and the output port 14 are connected by a data bus 11b.

The input interface 13 is connected to the input port 12. Detection unit for obtaining information required for the vehicle behavior control, such as driver movement detection unit S1 for detecting the movement of the driver who drives the vehicle 1, ambient environment detection unit S2 for detecting presence or absence of the object and the shape of the road, subject vehicle state detection unit S3 for detecting the motion of the vehicle 1 are connected to the input interface 13. A signal output from the detection unit is converted to the signal, which may be used by the vehicle behavior control device 20, by an A/D converter 13a and a digital input buffer 13b in the input interface 13, and is transmitted to the input port 12. Thereby, the vehicle behavior control device 20 may obtain the information required for the vehicle behavior control according to this embodiment.

The output interface 15 is connected to the output port 14. Vehicle motion control unit C is connected to the output interface 15 for controlling the posture of the vehicle 1 as the controlled object in the vehicle behavior control according to this embodiment. The output interface 15 is provided with control circuits 15a and 15b, and operates the vehicle motion control unit C based on the control signal calculated by the vehicle behavior control device 20.

The vehicle motion control unit C is for controlling the motion and the posture of the vehicle 1 in a plane, and is, for example, the front wheel steering assist device 7, the rear wheel steering device 8, or the braking device. The front wheel steering assist device 7 according to this embodiment is a so-called electronic power steering (EPS) and is provided with a variable gear ratio steering (VGRS). That is to say, this serves to assist the operation of the steering wheel 9 with the electric motor, and changes the steering angle of the front wheel relative to the input of the steering wheel 9 according to the vehicle velocity, the driving force, a road condition, or the like. Thereby, the turning performance of the vehicle 1 may be improved, and when the steering wheel 9 is turned too mach, this may be controlled to stabilize the posture of the vehicle 1.

Also, the vehicle 1 according to the first embodiment is provided with the rear wheel steering device 8 and steers the rear wheel according to the vehicle velocity, the steering angle or the like. Thereby, the turning performance of the vehicle 1 can be improved, and the posture of the vehicle 1 can be stabilized. In addition, the left rear wheel braking device 6RL, the right rear wheel braking device 6RR, the left front wheel braking device 6FL, and the right front wheel braking device 6FR provided on the vehicle 1 may be independently controlled. Thereby, for example, when the braking force is applied to the wheel on an inner side of the turning while the vehicle 1 is turning, the turning performance can be improved. Also, when the braking force is applied to the wheel on an outer side of the turning, the vehicle 1 is prevented from spinning.

Also, when the vehicle 1 is provided with a driving force distribution device capable of changing the driving forces between the right and left driving wheels, the driving force distribution device also is the vehicle motion control unit C. For example, when the driving force of the driving wheel on the outer side of the turning is made larger than the driving force of the driving wheel on the inner side of the turning while the vehicle 1 is turning by using the driving force distribution device, the turning performance of the vehicle 1 may be improved. Further, when the vehicle 1 is provided with a so-called in-wheel motor, the control similar to that of the driving force distribution device may be performed, so that the in-wheel motor also is the vehicle motion control unit C. In this manner, the vehicle motion control unit C is the unit capable of controlling the motional state and the posture of the vehicle 1 by controlling the drive system and the operation system of the vehicle 1.

As shown in FIG. 2, the vehicle behavior control device 20 is composed of a traveling direction setting unit 21 and a vehicle behavior control unit 22. They are the units to execute the vehicle behavior control according to this embodiment. The traveling direction setting unit 21 and the vehicle behavior control unit 22 are configured to communicate control data to each other or to issue a command from one to the other.

The traveling direction setting unit 21 estimates the direction that the driver wants to travel based on the information obtained from the driver movement detection unit S1, the ambient environment detection unit S2 and the like for obtaining the information required for the vehicle behavior control according to this embodiment, and sets the targeted traveling direction of the vehicle 1. The vehicle behavior control unit 22 controls the vehicle motion control unit C such that the vehicle 1 travels in the traveling direction and with the posture, which are set by the traveling direction setting unit 21.

The control of the vehicle motion control unit C by the vehicle behavior control unit 22 may be to assist the operation of the driver of the vehicle 1 or may be fully automatic. Herein, when the vehicle 1 is provided with, for example, a traction control system, a vehicle stability control (VSC) system, or a vehicle dynamics integrated management (VDIM) system, the control to the vehicle motion control unit C by the vehicle behavior control unit 22 may be realized by using the systems.

The computer program including a procedure of the vehicle behavior control according to this embodiment, a control map or the like are stored in the storage unit 16. The storage unit 16 may be composed of a nonvolatile memory such as a flash memory, a volatile memory such as a random access memory (RAM), or a combination thereof. Meanwhile, the above-described computer program may be that capable of realizing the procedure of the vehicle behavior control according to this embodiment by being combined with the computer program which the vehicle behavior control device 20 already has. Also, the function of the traveling direction setting unit 21 and the vehicle behavior control unit 22 may be realized by using a specialized hardware in place of the computer program. Next, the procedure of the vehicle behavior control according to this embodiment is described. In the following description, please appropriately refer to FIGS. 1 and 2.

Figure 3B:
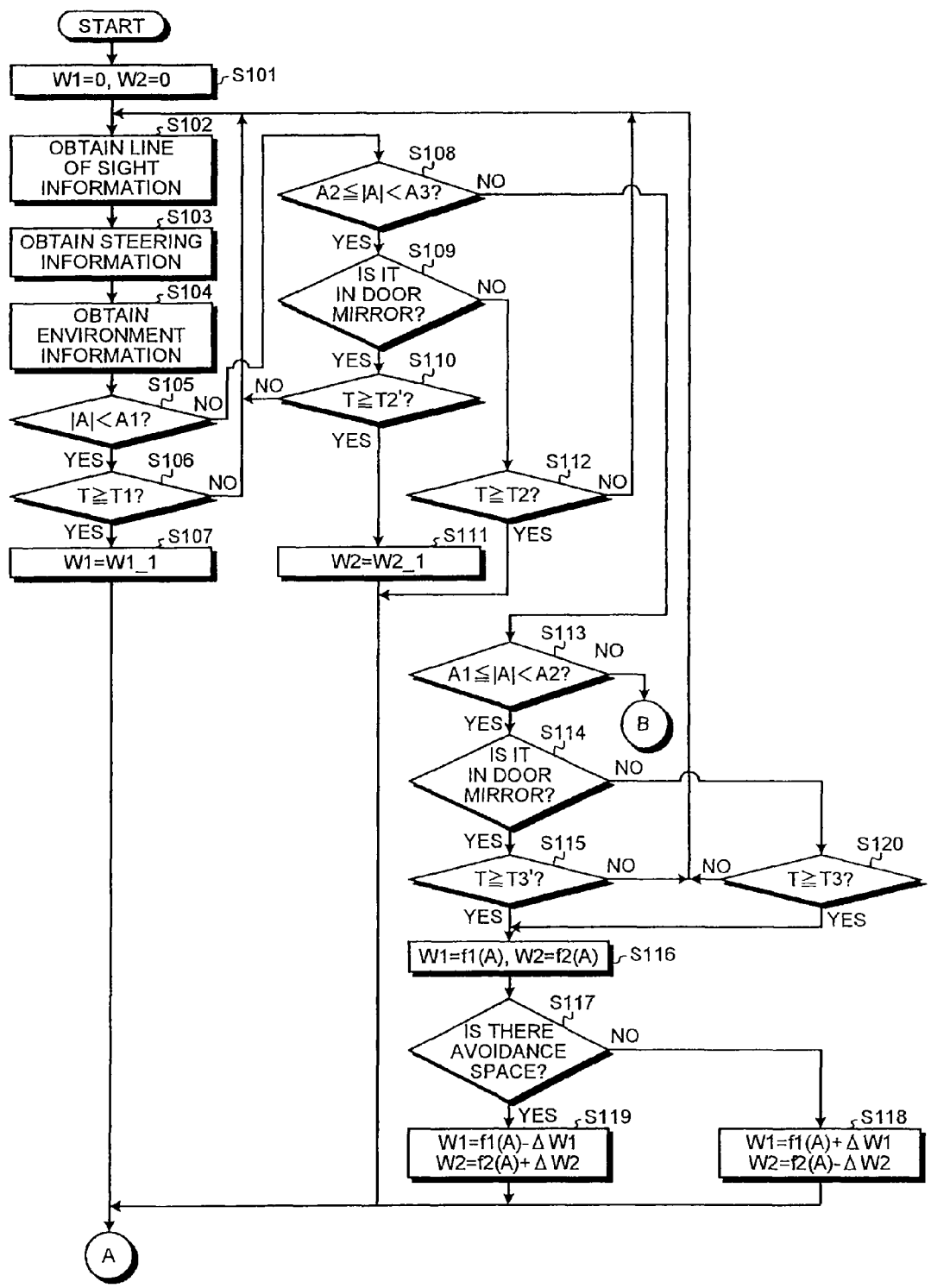
FIGS. 3B and 3C are flowcharts of a detailed procedure of the vehicle behavior control according to the embodiment.
Figure 3C:
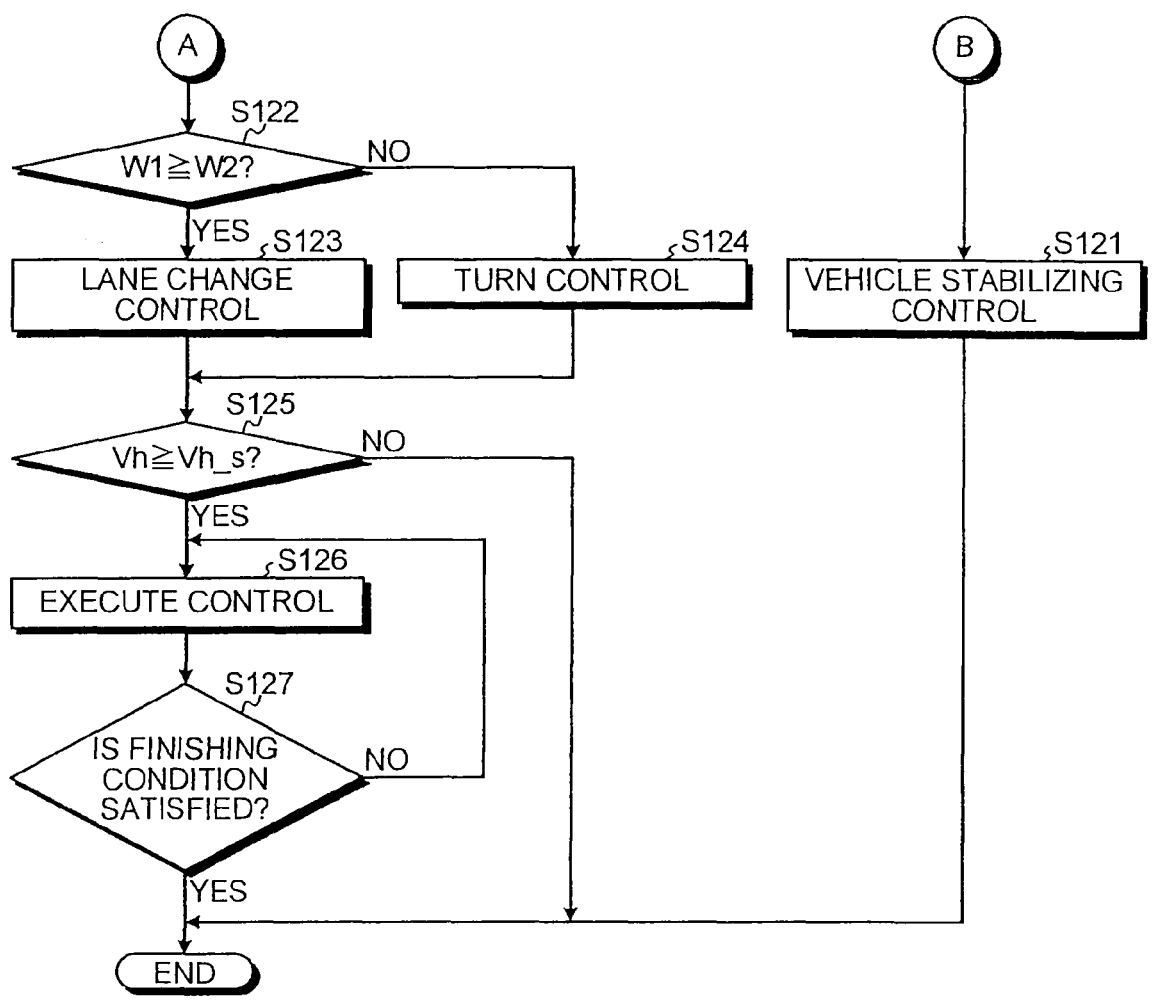

FIG. 3A is a flowchart showing a schematic procedure of the vehicle behavior control according to this embodiment. FIGS. 3B and 3C are flowcharts showing a detailed procedure of the vehicle behavior control according to this embodiment. First, the schematic procedure of the vehicle behavior control according to this embodiment is described with reference to FIG. 3A. In the vehicle behavior control according to this embodiment, the movement of the driver of the vehicle 1, the ambient environment of the vehicle 1, and the operating state of the vehicle 1 are always monitored (step S11), and a control principle of the motion of the vehicle 1 (vehicle motion) is decided based on the information (step S12). Then, the direction that the driver wants to travel is determined from the movement of the driver (step S13), and the control mode of the vehicle posture control is changed such that the vehicle 1 drives in the direction, which the driver wants to travel, based on the determination result. That is to say, this controls the vehicle motion control unit C of the vehicle 1 (refer to FIG. 2).

Next, the detailed procedure of the vehicle behavior control according to this embodiment is described with reference to FIGS. 3B and 3C. When executing the vehicle behavior control according to this embodiment, the traveling direction setting unit 21 which the vehicle behavior control device 20 has sets a lane change control request parameter W1 and a turn control request parameter W2 to an initial value (=0) (step S101). Herein, a lane change control and a turn control are described.

Figure 4:
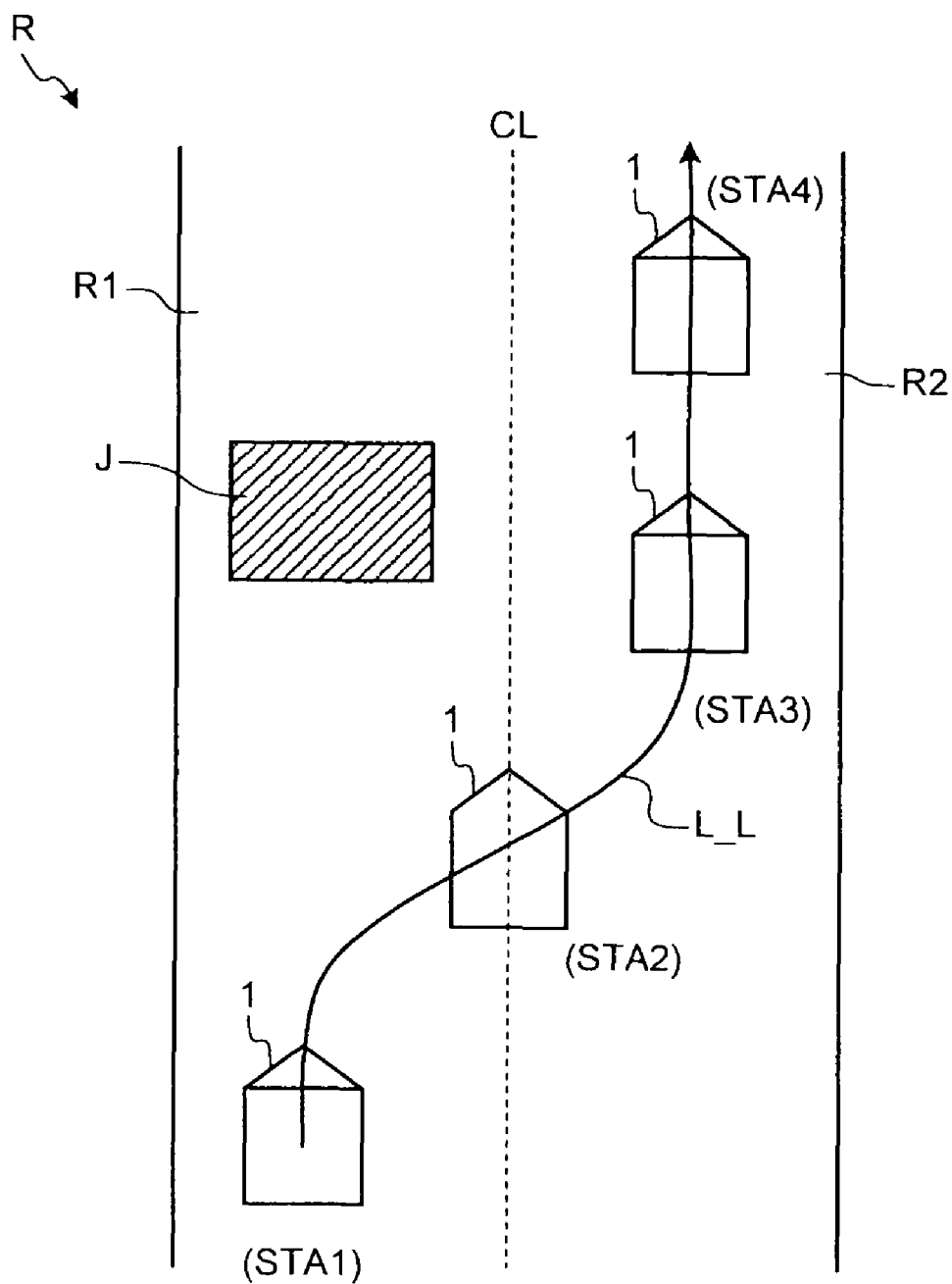
FIG. 4 is a schematic diagram for illustrating a motional state of the vehicle in the vehicle behavior control according to the embodiment.
Figure 5:
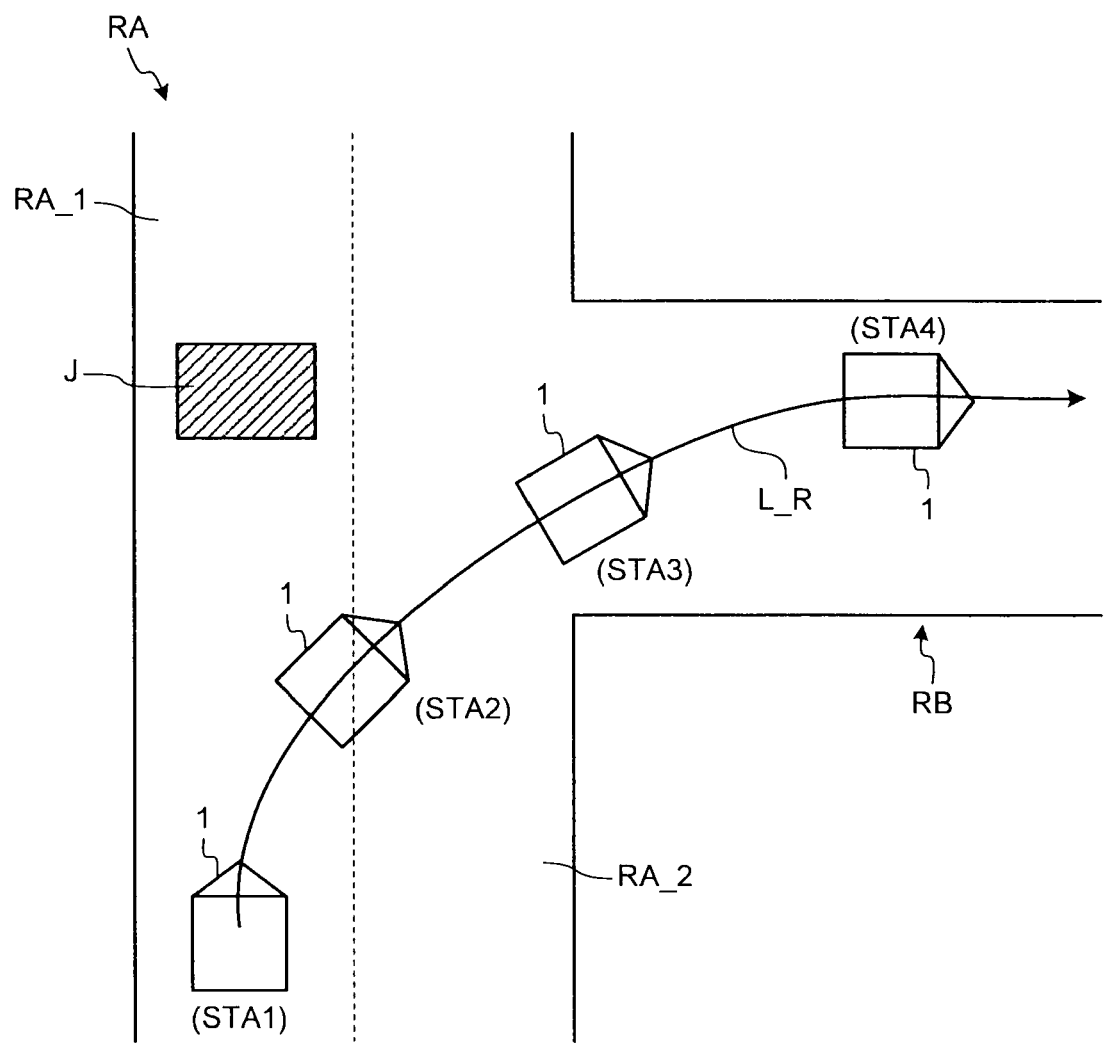
FIG. 5 is a schematic diagram for illustrating the motional state of the vehicle in the vehicle behavior control according to the embodiment.

FIGS. 4 and 5 are schematic diagrams for illustrating the motional state of the vehicle in the vehicle behavior control according to this embodiment. The above-described lane change control and the turn control are for controlling the motional state and the posture of the vehicle. First, the lane change control is described. As shown in FIG. 4, when an object J is present in front of the vehicle 1 in the traveling direction, the vehicle 1 driving on a first lane R1 of a road R, the driver of the vehicle 1 operates the vehicle 1 so as to avoid the collision between the vehicle 1 and the object J. In a case of the example shown in FIG. 4, since a second lane R2 of the road R is unoccupied, the driver of the vehicle 1 tries to avoid the object J which is present on a course of the vehicle 1, while traveling on the road R now traveling. In this case, the driver avoids the object J by changing the lane of the vehicle 1 to the second lane R2 beyond a lane marking CL, and after avoiding the object J, changes the course of the vehicle 1 to the original first lane R1 as needed. A vehicle trajectory at that time is represented as L_L.

The motion that the vehicle 1 changes the lane to drive while traveling the road R on which this now travels and after that the vehicle 1 returns back to the original lane as needed in the manner described above is referred to as a lane change. Then, when the vehicle 1 performs the lane change, the vehicle motion control unit C (FIG. 2) is controlled so as to give a priority to a displacement of the vehicle 1 in the lateral direction and to limit turning round of the vehicle 1. This control is referred to as the lane change control. In the lane change control, for example, the slip angle of the vehicle 1 is controlled so as to be smaller than the slip angle of the vehicle 1 inevitably realized as the vehicle characteristics by the steering by the driver and the slip angle realized by an intervening control by the steering. Then, a lateral displacement amount (the displacement amount in a direction orthogonal to the front-rear direction of the vehicle 1) gain of the driver relative to the steering or the lateral displacement amount with respect to a unit driving distance becomes larger than the lateral displacement amount gain or the like of the vehicle 1 inevitably realized as the vehicle characteristics by the steering by the driver. Thereby, it becomes possible to safely and rapidly perform the lane change. Next, the turn control is described.

As shown in FIG. 5, for example, when the object J is present in front of the vehicle 1 in the traveling direction, the vehicle 1 driving on a first lane RA_1 of a first road RA, the driver of the vehicle 1 operates the vehicle 1 so as to avoid the collision between the vehicle 1 and the object J. In a case shown in FIG. 5, since a second road RB, which intersects with the first road RA, is present on a position closer to the vehicle 1 than the object J, the driver of the vehicle 1 may avoid the object J, which is present on the course of the vehicle 1, by changing the course from the first road RA to the second road RB. In this case, the driver avoids the object J by changing the course of the vehicle 1 from the first road RA to the second road RB. The vehicle trajectory at that time is represented as L_R. Meanwhile, when there is a parking space or a passing space, they may be used when avoiding the object J.

The motion to change the course from the first road RA on which the vehicle 1 now travels to the second road RB in this manner is referred to as the turning round. When the vehicle 1 performs the turning round, the vehicle motion control unit C (FIG. 2) is controlled such that the turn of the vehicle 1 has the priority and allows the vehicle 1 to follow the turning trajectory. The control is referred to as the turning round control. In the turning round control, the vehicle motion control unit C of the vehicle 1 is controlled so as to have a yaw gain, which is larger than the yaw gain of the vehicle 1 inevitably realized as the vehicle characteristics by the steering by the driver and the yaw gain of the vehicle 1 realized by the intervening control by the steering by the driver. Thereby, the yaw of the vehicle 1 may be made larger than the yaw of the vehicle 1 inevitably realized as the vehicle characteristics, so that the vehicle 1 immediately move into the turning motion, and the course may be rapidly changed.

Meanwhile, the yaw generated in the vehicle 1 in the turn control is larger than the yaw generated in the vehicle 1 in the lane change control. That is to say, the yaw generated in the vehicle 1 in the lane change control is smaller than the yaw generated in the vehicle 1 in the turn control. Therefore, when the targeted traveling direction of the vehicle 1 is present in the direction that the vehicle 1 travels as in the lane change, the yaw generated in the vehicle 1 becomes smaller than in a case in which the targeted traveling direction of the vehicle 1 is present out of the direction that the vehicle drives as in the turn control. Thereby, the lane change and the turn may be more certainly executed.

Herein, the motion control of the vehicle such as the lane change control and the turning round control is the control for realizing the direction that the driver wants to travel. Therefore, when setting the control, the targeted traveling direction of the vehicle 1 is estimated based on the direction that the driver wants to travel and set as a parameter used for the control.

When the lane change control request parameter W1 and the turn control request parameter W2 are set to the initial value (=0), the traveling direction setting unit 21 obtains line of sight information of the driver (step S102), obtains steering information of the driver (step S103), and obtains environment information of the vehicle 1 (step S104). This is for obtaining the information to determine the direction when the driver indicates his intention of the direction that he wants to travel. Meanwhile, the order of the steps S101, S102, and S103 is no object.

The line of sight information of the driver is detected by the face direction detecting sensor 41 and the line of sight detecting sensor 42 of the driver movement detection unit S1 (FIG. 2). The steering information of the driver is detected by the steering angle sensor 40 of the driver movement detection unit S1 (FIG. 2) and the steering torque sensor 50 of the front wheel steering assist device 7. Meanwhile, for example, a variation in yaw rate due to the operation (steering) of the steering wheel 9 and variation in lateral G of the vehicle 1 in addition to the information regarding the steering angle detected by the sensors may be used as the steering information. Herein, the yaw rate is detected by the yaw rate sensor 49, and the lateral G of the vehicle 1 is detected by the acceleration sensor 48. Meanwhile, in this embodiment, the acceleration sensor 48 is capable of detecting the acceleration at least in two directions, that is to say, the front-rear direction and the lateral direction of the vehicle 1.

When obtaining the information for determining the motion control of the vehicle (steps S102 to S104), the traveling direction setting unit 21 determines to which direction the line of sight of the driver points from the obtained line of sight information of the driver, and determines the direction that the driver wants to travel, that is to say, the intention of the driver, based on this. For example, the line of sight direction of the driver is determined to be the direction that the driver wants to travel. Then, the traveling direction setting unit 21 sets the direction that the driver wants to travel as the targeted traveling direction of the vehicle 1 (target traveling direction). Meanwhile, the direction that the driver wants to travel may be determined by using the direction of face of the driver, or by using both of the line of sight and the direction of face. That is to say, it is preferable that the direction that the driver wants to travel is determined by using at least one of the line of sight and the direction of face of the driver, and the determination result is set as the target traveling direction.

Further, the line of sight or the direction of face of the driver may be corrected by the operating information of the driver to the vehicle 1 (for example, the information regarding the steering (such as the steering angle and a steering angle velocity) and information regarding the braking), the motion information and the posture information of the vehicle 1, and the ambient environment information of the vehicle 1. For example, when there is a cliff in the line of sight direction of the driver from the ambient environment information, priority (weight) of the line of sight direction of the driver is lowered and the priority (weight) of the ambient environment information is raised when estimating the target traveling direction. In this manner, by setting the target traveling direction to the direction judged to be safer based on the ambient environment information of the vehicle 1, the safety when driving the vehicle 1 can be more certainly assured.

Also, for example, when a plurality of objects are detected in the traveling direction of the vehicle 1 by the object detecting sensor 44, the driver sometimes tries to allow the vehicle 1 to pass between the objects by turning his eyes between the objects, for example. In such a case, the priority (weight) of the line of sight direction of the driver is raised and the priority (weight) of the ambient environment information is lowered when estimating the target traveling direction.

Also, when urgently avoiding the vehicle and a fallen object, which suddenly appear in the traveling direction of the vehicle 1, it is expected that the line of sight does not catch up with the steering velocity for avoidance. In such a case, the priority (weight) of line of sight direction of the driver is lowered and the priority (weight) of the information regarding the steering of the driver is raised when estimating the target traveling direction. For example, when it is steered with the steering angle velocity not lower than a predetermined steering angle velocity or when the steering wheel 9 is turned with the steering angle velocity not lower than the predetermined steering angle velocity with sudden braking, the priority (weight) of the information regarding the steering of the driver is raised.

In such a manner, by considering the operating information of the driver to the vehicle 1 and the ambient environment information of the vehicle 1 in addition to the line of sight direction and the direction of face of the driver when estimating the target traveling direction, it becomes possible to drive the vehicle in safe by further improving a degree of freedom of the control. Next, a relationship between the line of sight of the driver and the direction that the driver wants to travel is described.

Figure 6:
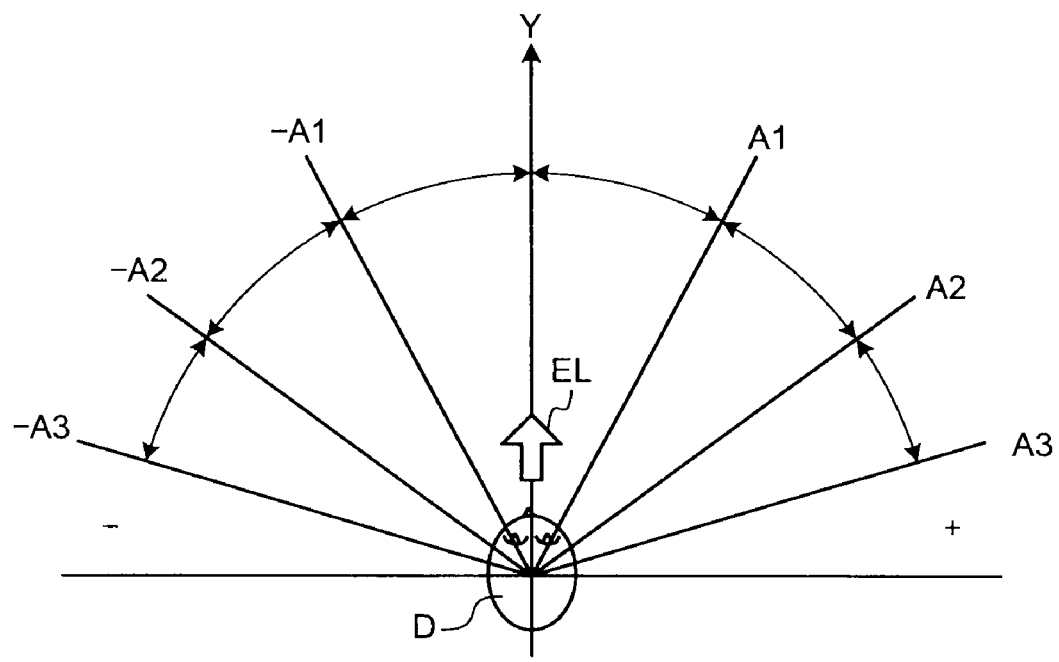
FIG. 6 is an illustrative diagram of a method to determine a direction that a driver wants to travel based on a line of sight of a driver.

FIG. 6 is an illustrative diagram of a method to determine the direction that the driver wants to travel based on the line of sight of the driver. In this embodiment, as shown in FIG. 6, the direction that a driver D wants to travel is determined by a measure of a tilt angle A of a line of sight direction EL of the driver D (referred to as a line of sight tilt angle) relative to the front-rear direction (Y direction in FIG. 6) of the vehicle 1 in a case in which a position of the face of the driver D is in the central portion.

In this embodiment when $-A1<A<A1$, it is considered that the driver D is willing to change the lane. In this case, it is determined that the direction that the driver D wants to travel is the direction to change the lane (for example, the second lane R2 in FIG. 4), and the target traveling direction is set to the direction to change the lane. When $-A3<A\leq-A2$ or $A2\leq A<A3$, it is considered highly possible that the driver D is willing to turn. In this case, the direction that the driver D wants to travel is determined to be the direction to turn (for example, the second road RB in FIG. 5), and the target traveling direction is set to the direction to turn.

When $-A2<A\leq-A1$ or $A1\leq A<A2$, it is possible that the driver D is willing to change the lane and that he is willing to turn. In this case, the direction that the driver D wants to travel is determined in consideration of the ambient environment of the vehicle 1. A1 is a first tilt angle threshold, A2 is a second tilt angle threshold, and A3 is a third tilt angle threshold, and all of them are set based on experiments, experiences, and the like.

Meanwhile, even when the line of sight tilt angle A is within the above-described range, when the driver D does not look out of the vehicle 1, such as a case in which the driver D looks in a room mirror, the line of sight direction EL and the direction of the face of the driver at that time do not indicate the direction that the driver wants to travel. Therefore, when it is judged that the driver does not look out of the vehicle, the line of sight direction EL of the driver and the direction of face of the driver at that time are not used when estimating the target traveling direction. Thereby, the direction that the driver D wants to travel is more certainly recognized, so that a sense of discomfort brought to the driver at the time of the vehicle behavior control may be further reduced.

Figure 7:
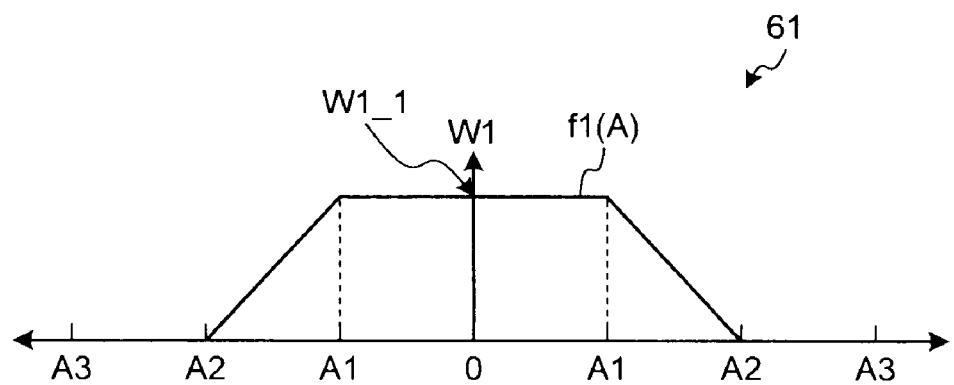
FIG. 7 is an illustrative diagram of an example of a control map used when estimating a traveling direction of the vehicle.
Figure 8:
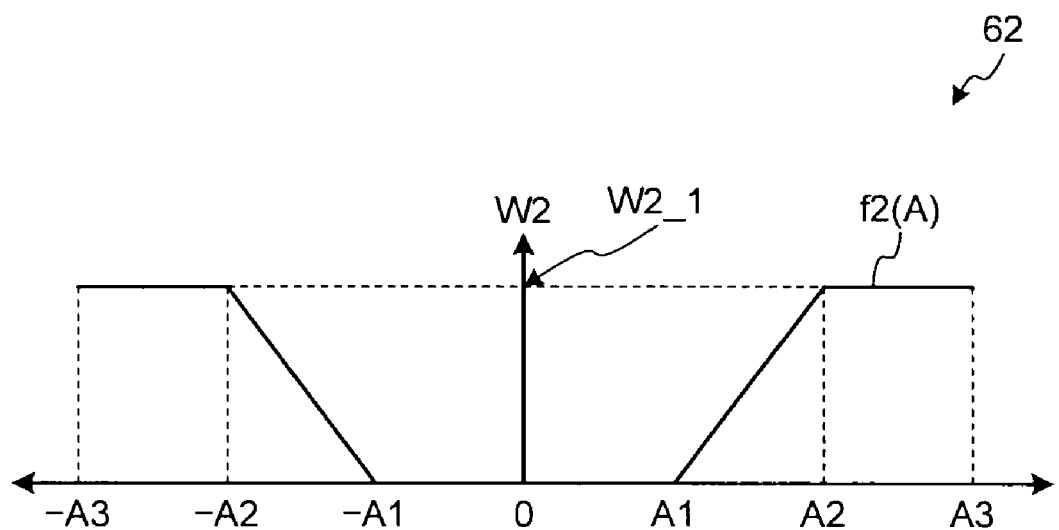
FIG. 8 is an illustrative diagram of an example of the control map used when estimating the traveling direction of the vehicle.

FIGS. 7 and 8 are illustrative diagrams showing one example of the control map used when estimating the traveling direction of the vehicle. In this embodiment, when estimating the target traveling direction, the lane change control request parameter W1 and the turn control request parameter W2 are used to select the lane change control or the turn control by comparing the sizes thereof. For example, when $W1 \geq W2$, the lane change control is executed, and when $W1 < W2$, the turn control is executed. In this embodiment, the lane change control request parameter W1 and the turn control request parameter W2 are decided according to a lane change control request parameter map 61 (FIG. 7) and a turn control request parameter map 62 (FIG. 8), respectively, which are described according to the first to third tilt angle thresholds A1 to A3.

In the lane change control request parameter map 61, $W1=f1(A)$, and this is described as a function of the line of sight tilt angle A, and is stored in the storage unit 16 of the ECU 10. In this embodiment, in the lane change control request parameter map 61, $W1=W1\_1$ when $-A1<A<A1$, and $W1=0$ when $-A3<A\leq-A2$ or $A2\leq A<A3$. Also, W1 decreases with increase in the line of sight tilt angle A when $-A2<A\leq-A1$, and W1 increases with increase in the line of sight tilt angle A when $A1\leq A<A2$. Thereby, the lane change control request parameter W1 may be changed according to the line of sight direction of the driver. That is to say, the lane change control request parameter W1 is weighted according to the line of sight direction of the driver, that is to say, the intention of the driver. Meanwhile, the information indicating the intention of the driver includes the direction of face of the driver or the like in addition to the line of sight direction of the driver.

In the turn control request parameter map 62, $W2=f2(A)$ and this is described as the function of the line of sight tilt angle A, and is stored in the storage unit 16 of the ECU 10. In this embodiment, in the turn control request parameter map 62, $W2=0$ when $-A1<A<A1$, and $W2=W2\_1$ when $-A3<A\leq-A2$ or $A2\leq A<A3$. Also, W2 increases with increase in the line of sight tilt angle A when $-A2<A\leq-A1$, and W2 decreases with increase in the line of sight tilt angle A when $A1\leq A<A2$. Thereby, the turn control request parameter W2 may be changed according to the line of sight direction of the driver. That is to say, the turn control request parameter W2 is weighted according to the line of sight direction of the driver, that is to say, the intention of the driver. Meanwhile, information indicating the intention of the driver includes the direction of face of the driver or the like in addition to the line of sight direction of the driver.

In this manner, by using the lane change control request parameter W1 and the turn control request parameter W2 which are changed according to the line of sight direction of the driver indicating the direction that the driver wants to travel, the direction that the driver wants to travel may be appropriately determined. Thereby, the target traveling direction may be estimated by reflecting the intention of the driver. Meanwhile, the lane change control request parameter W1 and the turn control request parameter W2 may be weighted based on the motional state and the posture of the vehicle 1, and the ambient environment of the vehicle 1.

When estimating the target traveling direction based on the line of sight direction of the driver, the traveling direction setting unit 21 compares the line of sight tilt angle A obtained at the step S102 and the first tilt angle threshold A1 (step S105). When $-A1<A<A1$ ($|A|<A1$, step S105: Yes), it is determined whether to execute the lane change control or not. In this case, the traveling direction setting unit 21 determines whether an elapsed time T from a time point when the line of sight tilt angle A becomes $-A1<A<A1$ becomes equal to or longer than a first set time T1 set in advance or not (step S106). When the line of sight tilt angle A is $-A1<A<A1$, it is considered that the driver is willing to change the lane; however, when the time is minute, there is a case in which the line of sight of the driver merely moves and he is not willing to change the lane. Therefore, when the time in which the line of sight tilt angle A is $-A1<A<A1$ continues for a predetermined time (the first set time T1), it is determined that the driver is willing to change the lane. Thereby, accuracy of determination of the direction that the driver wants to travel is improved. Herein, a value at the time of determination or an average value of the predetermined time may be used as the line of sight tilt angle A (this applies also in the following description.).

When $T<T1$ (step S106: No), since the first set time T1 has not passed yet, the procedures from the step S102 to the step S106 are repeated until the first set time T1 has passed. When $T \geq T1$ (step S106: Yes), it is determined that the driver is willing to change the lane. The direction that the driver wants to travel is the direction to change the lane, and the target traveling direction is set to the direction to change the lane. The traveling direction setting unit 21 sets the target traveling direction to the direction to change the lane (for example, the second lane R2 in FIG. 4). In this embodiment, when estimating the target traveling direction, the traveling direction setting unit 21 sets the lane change control request parameter W1 to W1_1 (step S107).

When $-A1 \geq A$, or $A1 \leq A$ ($|A| \geq A1$, step S105: No), it is determined whether to execute the turn control or not. In this case, the traveling direction setting unit 21 compares the line of sight tilt angle A, and the second and third tilt angle thresholds A2 and A3 (step S108). When $-A3<A \leq -A2$ or $A2 \leq A<A3$ ($A2 \leq |A|<A3$, step S108: Yes), the traveling direction setting unit 21 determines whether the line of sight of the driver is in the door mirror or not (step S109). The determination is described.

Figure 9:
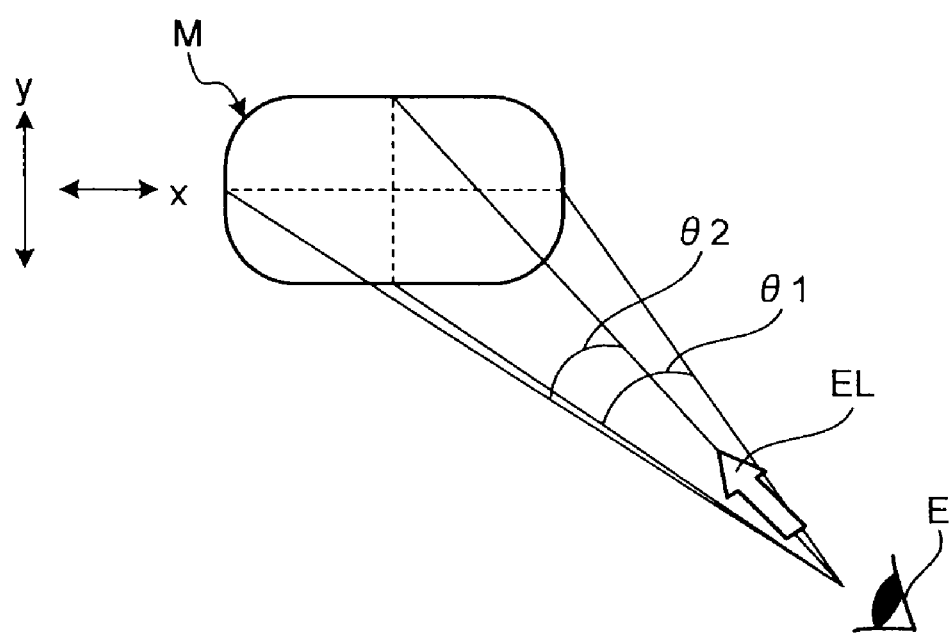
FIG. 9 is an illustrative diagram when determining whether the line of sight of the driver is in a door mirror or not.
Figure 10:
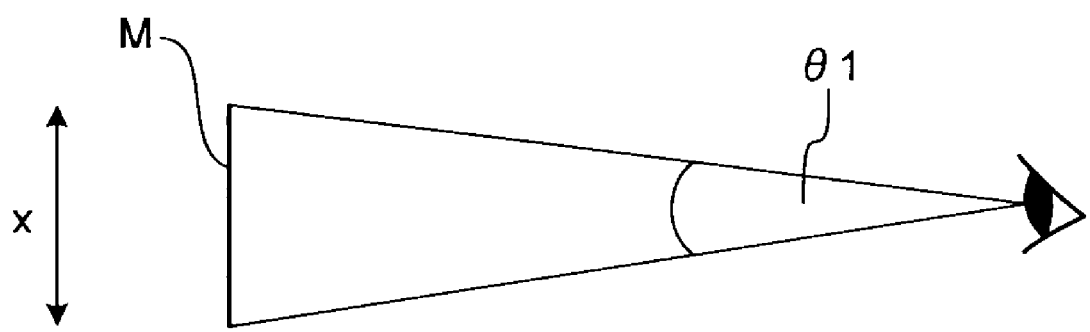
FIG. 10 is an illustrative diagram when determining whether the line of sight of the driver is in the door mirror or not.
Figure 11:
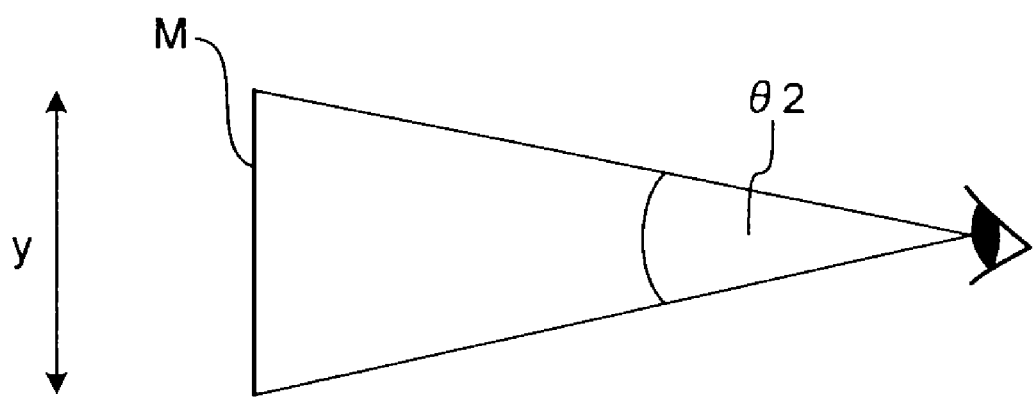
FIG. 11 is an illustrative diagram when determining whether the line of sight of the driver is in the door mirror or not.

FIGS. 9 to 11 are illustrative drawings when determining whether the line of sight of the driver is in the door mirror or not. In FIGS. 9 to 11, a y direction is a vertical direction (direction of action of gravity), and an x direction is a direction orthogonal to the y direction. When the line of sight direction EL of the driver is in a door mirror M, it is considered that the driver looks behind in the door mirror M. In the determination whether to execute the turn control or not, it is determined whether a state in which $-A3<A \leq -A2$ or $A2 \leq A<A3$ continues for a predetermined time (a second set time T2) or not; however, when the line of sight direction EL of the driver is in the door mirror M, the second set time T2 is prolonged to T2' (a corrected second set time) (T2'>T2). Thereby, it becomes possible to determine whether to execute the turn control or not in consideration with looking behind in the door mirror M, so that the accuracy of determination of the direction that the driver wants to travel is improved.

When the line of sight of the driver is in the door mirror (step S109: Yes), the traveling direction setting unit 21 extends the second set time T2 to T2'. Then, the traveling direction setting unit 21 determines whether the elapsed time T from the time point when the line of sight tilt angle A becomes $-A3<A \leq A2$ or $A2 \leq A<A3$ becomes equal to or longer than the corrected second set time T2' determined in advance or not (step S110). When $T<T2'$ (step S110: No), the corrected second set time T2' has not passed yet, so that the procedures from the step S102 to the step S110 are repeated until the corrected second set time T2' passes.

When $T \geq T2'$ (step S110: Yes), that is to say, when the line of sight direction EL of the driver is still in the door mirror M even after the corrected second set time T2' has passed, it is judged that this is not the door mirror M the driver really looks at, and it is determined that the driver requests to turn. In this case, the direction that the driver wants to travel is the direction to turn, and the target traveling direction is set to the direction to turn. The traveling direction setting unit 21 sets the target traveling direction to the direction to turn (for example, the second road RB in FIG. 5). In this embodiment, when estimating the target traveling direction, the traveling direction setting unit 21 sets the turn control request parameter W2 to W2_1 (steps S111). When the line of sight of the driver is not in the door mirror (step S109: No), since the line of sight tilt angle A is $-A3<A \leq -A2$ or $A2 \leq A<A3$, it is considered that the driver is willing to turn. However, when the time is minute, there is a case in which the line of sight of the driver merely moves and he is not willing to turn. Therefore, when the time in which the line of sight tilt angle A is $-A3<A \leq -A2$ or $A2 \leq A<A3$ continues for a predetermined time (the second set time T2), it is determined that the driver is willing to turn. Thereby, the accuracy of determination of the direction that the driver wants to travel is improved.

When the line of sight of the driver is not in the door mirror (step S109: No), the traveling direction setting unit 21 determines whether the elapsed time T from the time point when the line of sight tilt angle A becomes $-A3<A \leq -A2$ or $A2 \leq A<A3$ becomes equal to or longer than the second set time T2 determined in advance or not (step S112). When $T<T2$ (step S112: No), the second set time T2 has not passed yet, so that the procedures from the step S102 to the step S112 are repeated until the second set time T2 passes.

When $T \geq T2$ (step S112: Yes), the direction that the driver wants to travel is the direction to turn, and the target traveling direction is set to the direction to turn. The traveling direction setting unit 21 sets the target traveling direction to the direction to turn (for example, the second road RB in FIG. 5). In this embodiment, when estimating the target traveling direction, the traveling direction setting unit 21 sets the turn control request parameter W2 to W2_1 (step S111).

When $-A3<A \leq -A2$ and $A2 \leq A<A3$ are not satisfied (step S108: No), the lane change control or the turn control is executed according to the ambient environment (such as presence or absence of the object and the avoidance space) of the vehicle 1. In this case, the traveling direction setting unit 21 compares the line of sight tilt angle A and the first and second tilt angle thresholds A1 and A2 (step S113). When $-A2<A \leq -A1$ or $A1 \leq A<A2$ ($A1 \leq |A|<A2$, step S113: Yes), the traveling direction setting unit 21 determines whether the line of sight of the driver is in the door mirror or not (step S114).

When the line of sight of the driver is in the door mirror (step S114: Yes), the traveling direction setting unit 21 extends the third set time T3 to a corrected third set time T3'. Then, the traveling direction setting unit 21 determines whether the elapsed time T from the time point when the line of sight tilt angle A becomes $-A2<A \leq -A1$ or $A1 \leq A<A2$ becomes equal to or longer than the corrected third set time T3' determined in advance (step S115). When T<T3' (step S115: No), the corrected third set time T3' has not passed yet, so that the procedures from the step S102 to the step S115 are repeated until the corrected third set time T3' passes.

Herein, the above-described first set time T1, the second set time T2, the corrected second set time T2', the third set time T3, and the corrected third set time T3' are set based on the experiments and analyses in consideration of an operational velocity of the vehicle behavior control device 20.

When T≧T3' (step S115: Yes), that is to say, when the line of sight direction EL of the driver is still in the door mirror M even after the corrected third set time T3' has passed, it is judged that it is not the door mirror M the driver really looks at, and it is determined that the driver requests to change the lane or to turn. In this case, the direction that the driver wants to travel is the direction to change the lane or the direction to turn, and the target traveling direction is set to the direction to change the lane or the direction to turn. In this embodiment, when estimating the target traveling direction, the traveling direction setting unit 21 sets the lane change control request parameter W1 to f1(A) and the turn control request parameter W2 to f2(A) (step S116). Herein, f1(A) is obtained from the lane change control request parameter map 61 (FIG. 7) and f2(A) is obtained from the turn control request parameter map 62 (FIG. 8).

Next, when setting the lane change control request parameter W1 and the turn control request parameter W2 (step S116), the traveling direction setting unit 21 determines whether there is the avoidance space in front of the vehicle 1 in the traveling direction or not from the ambient environment information of the vehicle 1 obtained at the step S104 (step S117). The avoidance space is, for example, the passing space and the parking space, and the road or the like intersecting with the road on which the vehicle 1 travels.

When there is the avoidance space, it is considered highly possible that the driver turns the vehicle 1 and drives the vehicle 1 toward the avoidance space. In this case, it is configured that the weight of the turn control request parameter W2 is large and the weight of the lane change control request parameter W1 is small such that the turn control is selected. On the other hand, when there is not the avoidance space, it is considered highly possible that the driver avoids, for example, the object J (refer to FIG. 4), by changing the lane while driving on the road R now driving by the lane change. In this case, it is configured that the weight of the lane change control request parameter W1 is large and the weight of the turn control request parameter W2 is small.

When there is not the avoidance space (step S117: No), it is highly possible that the driver requests to change the lane, so that the traveling direction setting unit 21 sets such that the weight of the lane change control request parameter W1 is large and the weight of the turn control request parameter W2 is small. In this embodiment, a first weighting coefficient ΔW1 is added to the lane change control request parameter W1 set at the step S116 and a second weighting coefficient ΔW2 is subtracted from the turn control request parameter W2 set at the same step S116 (step S118).

When there is the avoidance space (step S117: Yes), it is highly possible that the driver requests to turn, so that the traveling direction setting unit 21 sets such that the weight of the turn control request parameter W2 is large and the weight of the lane change control request parameter W1 is small. In this embodiment, the first weighting coefficient ΔW1 is subtracted from the lane change control request parameter W1 set at the step S116 and the second weighting coefficient ΔW2 is added to the turn control request parameter W2 set at the same step S116 (step S119). Herein, absolute values of the first and second weighting coefficients ΔW1 and ΔW2 may be the same with or different to each other. Also, the first and second weighting coefficients ΔW1 and ΔW2 may be changed according to the ambient environment of the vehicle 1. In this manner, the ambient environment of the vehicle 1 may be considered, so that the control which further follows the intention of the driver can be executed.

When the line of sight of the driver is not in the door mirror (step S114: No), since the line of sight tilt angle A is −A2<A≦−A1 or A1≦A<A2, it is considered that the driver is willing to turn. However, when the time is minute, there is a case in which the line of sight of the driver merely moves and he is not willing to change the lane or to turn. Therefore, when the time in which the line of sight tilt angle A is −A2<A≦−A1 or A1≦A<A2 continues for a predetermined time (a third set time T3), it is determined that the driver is willing to change the lane or to turn. Thereby, the accuracy of determination of the direction that the driver wants to travel is improved.

When the line of sight of the driver is not in the door mirror (step S114: No), the traveling direction setting unit 21 determines whether the elapsed time T from the time point when the line of sight tilt angle A becomes A2<A≦−A1 or A1≦A<A2 becomes equal to or longer than the third set time T3 set in advance or not (step S120). When T<T3 (step S120: No), the third set time T3 has not passed yet, so that the procedures from the step S102 to the step S120 are repeated until the third set time T3 passes.

When T≧T3 (step S120: Yes), the direction that the driver wants to travel is the direction to change the lane or the direction to turn, and the target traveling direction is set to the direction to change the lane or to the direction to turn. In this embodiment, when estimating the target traveling direction, the traveling direction setting unit 21 sets the lane change control request parameter W1 and the turn control request parameter W2 to f1(A) and f2(A), respectively (step S116). The following procedures from a step S117 to a step S119 are same as above, so that the description thereof is omitted.

When −A2<A≦−A1 and A1≦A<A2 are not satisfied (step S113: No), the line of sight tilt angle A is A3≦A or A≦−A3 (refer to FIG. 6). In this case, the line of sight tilt angle A is close to 180 degrees (refer to FIG. 6), and the vehicle 1 is not able to physically move to the line of sight direction of the driver. In this case, the driver looks at not the road but the lateral direction of the vehicle 1, and it is judged that the driver does not request to change the lane or to turn. Therefore, the traveling direction setting unit 21 sets the lane change control request parameter W1 and the turn control request parameter W2 to 0 from the lane change control request parameter map 61 (FIG. 7) and the turn control request parameter map 62 (FIG. 8), respectively.

Thereby, it is configured that the direction which is not intended by the driver is not set as the target traveling direction, by not using the line of sight direction and the direction of face of the driver when A3≦A or A≦−A3 when estimating the target traveling direction. Then, the vehicle behavior control device 20 executes a general vehicle stabilization control such as the VSC and a traction control (step S121).

When the lane change control request parameter W1 and the turn control request parameter W2 are set by the procedures from the above-described step S101 to the step S120, the traveling direction setting unit 21 compares the set lane change control request parameter W1 and the turn control request parameter W2 (step S122).

By the above-described procedures, the values of the lane change control request parameter W1 and the turn control request parameter W2 are decided by at least one of the intention of the driver of the vehicle 1 (such as the line of sight direction of the driver) and the ambient environment of the vehicle 1 (presence or absence of the avoidance space). The motion control of the vehicle such as the lane change control and the turn control is the control for realizing the direction that the driver wants to travel, so that to set them means to set the target traveling direction. In this embodiment, the lane change control, the turn control, and an intermediate control of them are selected according to the values of W1 and W2. That is to say, the values of W1 and W2 are the priority (weight) when estimating the target traveling direction.

In this manner, in this embodiment, the target traveling direction is decided according to the priority (weight) given to candidates of the target traveling direction according to at least one of the intention of the driver and the ambient environment of the vehicle 1. More specifically, the larger one (the one having larger weight) of the lane change control request parameter W1 and the turn control request parameter W2 representing the candidates of the target traveling direction is selected as the control to realize the targeted traveling direction. Then, the motion control of the vehicle decided by the selected parameter is executed and the vehicle 1 drives in the target traveling direction.

When W1≧W2 (step S122: Yes), the traveling direction setting unit 21 determines that the request of the driver is to change the lane, and sets the lane change control as the motion control of the vehicle (step S123). When W1<W2 (step S122: No), the traveling direction setting unit 21 determines that the request of the driver is to turn, and sets the turn control as the motion control of the vehicle (step S124).

When the driver avoids the object J (refer to FIG. 4 or the like), which might collide with the vehicle 1, the motion control of the vehicle is selected according whether to avoid in the direction that the vehicle 1 drives (that is to say, the lane change) or to avoid out of the direction that the vehicle 1 drives (that is to say, turning). Thereby, the target traveling direction of the vehicle 1 is set. In this manner, according to this embodiment, it is possible to estimate the target traveling direction by reflecting the intention of the driver.

The traveling direction setting unit 21 decides the control principle to realize the set lane change control or the turn control. For example, when the lane change control is set as the motion control of the vehicle, the traveling direction setting unit 21 calculates the slip angle and the lateral displacement amount gain or the like, which become targets when performing the lane change control to the target traveling direction, based on the information detected by the driver movement detection unit S1 (FIG. 2) and the motional state of the vehicle 1 at the present time detected by the subject vehicle state detection unit S3 (FIG. 2). Also, when the turn control is set for example as the motion control of the vehicle, the traveling direction setting unit 21 calculates the yaw gain or the like, which becomes the target when performing the turn control in the target traveling direction, based on the information detected by the driver movement detection unit S1 (FIG. 2) and the motional state of the vehicle 1 at the present time detected by the subject vehicle state detection unit S3 (FIG. 2).

When the traveling direction setting unit 21 decides the control principle for realizing the lane change control or the turn control, the value of the lane change control request parameter W1 or the turn control request parameter W2, that is to say, the order of priority (weight) may be considered. For example, when W1 is larger (that is to say, the weight thereof is larger), the control amount of the lane change control is made larger compared with the case in which W1 is small (when the weight thereof is smaller). More specifically, when W1 is larger, the gain when steering in the same phase with the front wheel by the rear wheel steering device 8 is set larger than in a case in which the W1 is smaller. Thereby, it becomes possible to estimate the most preferred target traveling direction upon consideration of the intention of the driver and the ambient environment of the vehicle 1, and execute the motion control of the vehicle according to the same. Meanwhile, although the lane change control request parameter W1 is described herein, this is similar for the turn control request parameter W2.

The vehicle behavior control unit 22 of the vehicle behavior control device 20 obtains the steering information of the driver obtained by the driver movement detection unit S1 (FIG. 2) and determines whether the steering angle velocity Vh is equal to or larger than a predetermined steering angle velocity threshold Vh_s or not (step S125). When Vh<Vh_s (step S125: No), the vehicle behavior control unit 22 determines that the driver does not request to avoid the object J or to change the course. In this case, the vehicle behavior control is finished and the procedure returns back to START, and the vehicle behavior control device 20 continues to monitor the driver and the state of the vehicle 1.

When Vh<Vh_s (step S125: Yes), the vehicle behavior control unit 22 determines that the driver requests to urgently avoid the object J or to urgently change the course. In this case, the vehicle behavior control unit 22 controls the vehicle motion control unit C (refer to FIG. 2) by the control method and the control principle decided at the steps S123 and S124. Thereby, the lane change control or the turn control is executed (step S126).

For example, when executing the lane change control, the gain when steering in the same phase with the front wheel by the rear wheel steering device 8 is made higher than in a general case. Also, it is possible to limit the steering angle of the front wheel so as to be not larger than the predetermined value by an active steering function of the front wheel steering assist device 7 while applying the braking force to the wheel of the vehicle 1 by the braking device, thereby making the slip angle smaller than in the general case while lowering the velocity to change the lane.

Also, when executing the turn control, the gain when steering in the opposite phase to the front wheel by the rear wheel steering device 8 is made higher than that in the general case, or the steering angle of the front wheel is made larger than the steering angle corresponding to the actual steering amount by the active steering function of the front wheel steering assist device 7. It is also possible to apply the braking force to the wheel on the inner side of the turning, the force larger than that to the wheel on the outer side of the turning. Further, when the driving force can be changed between the right and left driving wheels, the driving force larger than that to the driving wheel on the inner side of the turning may be distributed to the driving wheel on the outer side of the turning. Also, for example, when role rigidity can be changed between the front wheel and the rear wheel by the variable stabilizer, the active suspension, and the like, the role rigidity of the vehicle 1 of the rear wheel may be made higher than in the case of general driving.

The vehicle behavior control according to this embodiment is finished after satisfying a finishing condition when the behavior of the vehicle 1 is stabilized, when avoiding the object J, when the avoiding motion is not performed, or the like. The behavior of the vehicle 1 is determined to be stabilized when the volume of the lateral G becomes equal to or smaller than the predetermined value, when a deviation of the yaw rate becomes equal to or smaller than the predetermined value, or when the slip angle becomes equal to or smaller than the predetermined value, for example (STA4 in FIGS. 4 and 5). The vehicle behavior control unit 22 continues the lane change control or the turn control when the finishing condition of the vehicle behavior control is not satisfied (step S127: No). When the finishing condition of the vehicle behavior control is satisfied (step S127: Yes), the vehicle behavior control is finished and the procedure returns back to START, and the vehicle behavior control device 20 continues to monitor the driver and the state of the vehicle 1.

In this embodiment, the movement of the driver, the ambient environment information of the vehicle 1, and the motional state of the vehicle 1 are monitored all the time. Then, at the above-described step S125, when the intention of the driver to avoid the object J or change the course is detected (such as STA1 in FIGS. 4 and 5), the lane change control, the turn control, or the intermediate control of the two is executed. In this manner, in this embodiment, the control of the vehicle motion control unit C may be started with the start of the operation of the driver. Thereby, the lane change control, the turn control, and the like may be executed at the appropriate timing in accordance with the operation by the driver, so that the sense of discomfort felt by the driver is further reduced, and the vehicle 1 may be certainly controlled according to the intention of the driver.

Figure 12A:
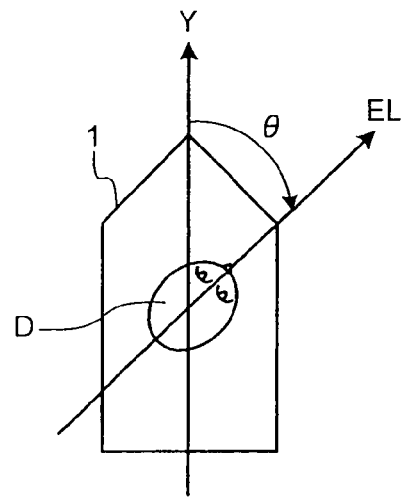
FIG. 12A is an illustrative diagram of a relationship between the line of sight of the driver and the traveling direction of the vehicle.
Figure 12B:
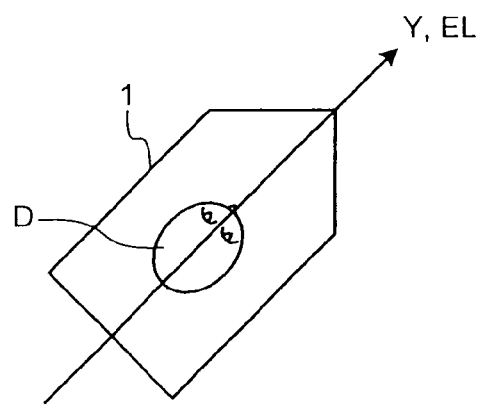
FIG. 12B is an illustrative diagram of the relationship between the line of sight of the driver and the traveling direction of the vehicle.
Figure 12C:
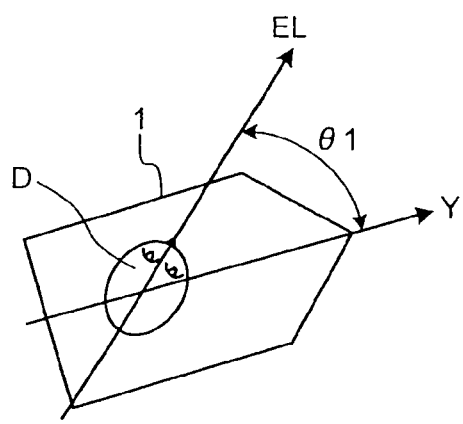
FIG. 12C is an illustrative diagram of the relationship between the line of sight of the driver and the traveling direction of the vehicle.

FIGS. 12A to 12C are illustrative diagrams showing a relationship between the line of sight of the driver and the traveling direction of the vehicle. In the vehicle behavior control according to this embodiment, the line of sight direction EL of the driver D is set as the targeted traveling direction of the vehicle 1, and the vehicle motion control unit C is controlled such that the front-rear direction (Y) of the vehicle 1 and the line of sight direction EL of the driver D are parallel, that is to say, conform to each other (FIGS. 12A and 12B). Thereby, for example, the sense of discomfort felt by the driver D due to excessive turning of the vehicle 1 than the line of sight direction EL of the driver D as shown in FIG. 12C is reduced, and the lane change, the turning, or avoidance of the collision with the object may be certainly realized.

Under the operating condition in which the driver of the vehicle 1 is a subject to operate the vehicle 1, when operating to avoid the collision with the object, if the steering wheel 9 is turned too much, the behavior of the vehicle 1 is disturbed, on the other hand, when the steering wheel 9 is turned too little, the collision with the object cannot be avoided. When the steering wheel 9 is turned excessively, in the control to limit the steering angle, only the steering gain smaller than that expected by the driver is generated, so that the driver might feel the sense of discomfort. Also, when the steering wheel 9 is turned too little, in the control to improve the turn performance of the vehicle 1 by increasing the steering gain and generating yaw moment in the vehicle 1, thereby avoiding the collision, the steering characteristics largely changes, and as a result, the turn motion of the vehicle 1 is generated more than the intention of the driver and this might bring the driver the sense of discomfort. Further, in the control in which the vehicle 1 is provided with the automatic operating device and creates the path to avoid the collision from the ambient environment of the vehicle 1 to automatically avoid the collision by temporally leaving the operation subject of the vehicle 1 to the automatic operating device, there is a case in which the automatic operation is different from the intention of the driver, and this might bring the sense of discomfort to the driver.

In the vehicle behavior control according to this embodiment, under the operating condition in which the driver of the vehicle 1 is the operational subject of the vehicle 1, the targeted traveling direction of the vehicle 1 is estimated from the line of sight and the movement of the face of the driver, or the steering operation and the brake operation, and it is controlled such that the traveling direction and the front-rear direction of the vehicle 1 conform to each other. Thereby, the request and the intention of the driver to the motion of the vehicle 1 may be reflected in the vehicle behavior control, so that it becomes possible to certainly operate the vehicle 1 according to the intention of the driver while preventing the sense of discomfort brought to the driver; thereby, the collision with the object may be avoided, for example. In addition, in a case in which the collision with the object is inevitable, the control to reflect the operational intention of the driver such as to dare to collide against a portion having the smallest damage becomes possible.

In the above description, the line of sight tilt angle A and the first to third tilt angle thresholds A1 to A3 are compared and one of the lane change control and the turn control is executed. Herein, for example, the vehicle motion control unit C (refer to FIG. 2) may be controlled so as to set deviation θ of the line of sight direction EL of the driver D to the front-rear direction (Y) of the vehicle 1 to 0. In addition, although one of the lane change control and the turn control is executed in the above description, the intermediate control of the lane change control and the turn control may be executed according to the volume of the lane change control request parameter W1 and the turn control request parameter W2. Then, the ratio of the lane change control is increased or the ratio of the turn control is increased according to the ratio of the lane change control request parameter W1 and the turn control request parameter W2. Thus configured, the intermediate control of the lane change control and the turn control may be executed, so that the sense of discomfort brought to the driver may further be reduced.

As the intermediate control of the lane change control and the turn control, for example, the gain when steering in the same phase with the front wheel by the rear wheel steering device 8 is made higher than in the general case, and the braking force larger than that of the wheel on the outer side of the turning is applied to the wheel on the inner side of the turning. The former is the lane change control and the latter is the turn control. The gain when steering in the same phase with the front wheel by the rear wheel steering device 8 and the braking force to be applied to the wheel on the inner side of the turning are changed according to the ratio of the lane change control request parameter W1 and the turn control request parameter W2.

As described above, in this embodiment, the vehicle motion control unit is controlled such that the front-rear direction of the vehicle faces the targeted traveling direction of the vehicle set based on the line of sight and the direction of the face of the driver. That is to say, the vehicle motion control unit is controlled such that the front-rear direction of the vehicle and the target traveling direction conform to each other or parallel to each other. Thereby, the motion and the posture of the vehicle are controlled such that the front of the driver conforms to the direction in which the vehicle travels, so that the driver may operate the vehicle in a state of always confirming the intended traveling direction. As a result, when the control to assist the vehicle operation by the driver is intervened, the sense of discomfort felt by the driver may be prevented.

Especially, when avoiding the object such as the preceding vehicle and the parked vehicle, and the fallen object, which are present in front of the vehicle, the operation tends to be quick and tendency that the control to assist the vehicle operation by the driver intervenes is strong; however, according to this embodiment, even in such a case, the sense of discomfort felt by the driver may be prevented and the collision with the object may be avoided more safely and certainly. Meanwhile, one having the configuration disclosed in this embodiment has the effect similar to that of this embodiment.

INDUSTRIAL APPLICABILITY

As described above, the vehicle behavior control device according to the present invention is useful in control to assist the vehicle operation by the driver, and especially suitable for preventing the sense of discomfort brought to the driver when the control to assist the operation of the driver intervenes.

The invention claimed is:

1. A vehicle behavior control device, comprising:
   a traveling direction setting unit that estimates a target traveling direction, which is a targeted traveling direction of a vehicle, based on a movement of a driver different from a movement performed by the driver for controlling motion of the vehicle; and
   a vehicle behavior control unit that changes a control mode of a vehicle behavior control to the vehicle, based on the target traveling direction set by the traveling direction setting unit, wherein
   the traveling direction setting unit estimates the target traveling direction based on at least one of a line of sight direction of a driver who operates the vehicle and a direction of a face of the driver.

2. The vehicle behavior control device according to claim 1, wherein
   the vehicle behavior control unit controls the motion of the vehicle in a plane direction and executes the vehicle behavior control such that a front-rear direction of the vehicle faces the target traveling direction set by the traveling direction setting unit.

3. The vehicle behavior control device according to claim 1, wherein
   the vehicle behavior control unit makes yaw generated in the vehicle to be smaller than in a case in which the target traveling direction is present out of the direction that the vehicle drives, when the target traveling direction is present in the direction that the vehicle drives.

4. The vehicle behavior control device according to claim 1, wherein
   the vehicle behavior control unit executes the vehicle behavior control with a start of an operation to the vehicle.

5. The vehicle behavior control device according to claim 1, wherein
   the traveling direction setting unit excludes a direction that the vehicle cannot travel physically from the target traveling direction.

6. The vehicle behavior control device according to claim 1, wherein
   the traveling direction setting unit does not use the line of sight direction of the driver who operates the vehicle and the direction of the face of the driver when the driver does not look out of the vehicle, when estimating the target traveling direction.

7. The vehicle behavior control device according to claim 1, wherein
   in the traveling direction setting unit, one of candidates, which has a larger weight given to the candidates of the target traveling direction according to at least one of an intention of the driver and an ambient environment of the vehicle, is selected as the target traveling direction.

8. The vehicle behavior control device according to claim 7, wherein
   in the vehicle behavior control unit, the larger the weight, the larger a control amount of the vehicle behavior control.

9. The vehicle behavior control device according to claim 8, wherein
   when avoiding an object, which might collide with the vehicle, the traveling direction setting unit selects a direction judged to be safer as the target traveling direction based on information of the ambient environment of the vehicle.

10. The vehicle behavior control device according to claim 1, wherein
    the target traveling direction is a traveling direction necessary for the vehicle to avoid the collision when the vehicle might collide.

11. The vehicle behavior control device according to claim 10, wherein
    the traveling direction setting unit estimates the target traveling direction according to whether to avoid the object, which might collide with the vehicle, to the direction that the vehicle drives, or out of the direction that the vehicle drives.

* * * * *